United States Patent
Grohman et al.

(10) Patent No.: US 9,152,155 B2
(45) Date of Patent: Oct. 6, 2015

(54) DEVICE ABSTRACTION SYSTEM AND METHOD FOR A DISTRIBUTED-ARCHITECTURE HEATING, VENTILATION AND AIR CONDITIONING SYSTEM

(75) Inventors: Wojciech Grohman, Little Elm, TX (US); Darko Hadzidedic, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 1149 days.

(21) Appl. No.: 12/603,362

(22) Filed: Oct. 21, 2009

(65) Prior Publication Data

US 2010/0106307 A1  Apr. 29, 2010

Related U.S. Application Data

(63) and a continuation-in-part of application No. 12/258,659, filed on Oct. 27, 2008.

(60) Provisional application No. 61/167,135, filed on Apr. 6, 2009.

(51) Int. Cl.
*G06F 15/16* (2006.01)
*G05D 27/02* (2006.01)

(52) U.S. Cl.
CPC ..................... *G05D 27/02* (2013.01)

(58) Field of Classification Search
CPC .................................................. G05D 27/02
USPC .................................. 709/223, 203; 700/276
See application file for complete search history.

(56) References Cited

U.S. PATENT DOCUMENTS

| | | |
|---|---|---|
| 4,296,464 A | 10/1981 | Woods et al. |
| 4,501,125 A | 2/1985 | Han |
| 4,694,394 A | 9/1987 | Costantini |
| 4,698,628 A | 10/1987 | Herkert et al. |
| 4,703,325 A | 10/1987 | Chamberlin et al. |
| 4,706,247 A | 11/1987 | Yoshioka |
| 4,723,239 A | 2/1988 | Schwartz |
| 4,841,450 A | 6/1989 | Fredriksson |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |

(Continued)

OTHER PUBLICATIONS

Related case U.S. Appl. No. 12/603,508, filed on Oct. 21, 2009 to Wojciech Grohman, entitled "Alarm and Diagnostics System and Method for a Distributed-Architecture Heating, Ventilation and Air Conditioning Network"

(Continued)

*Primary Examiner* — Ranodhi Serrao
*Assistant Examiner* — Thomas Richardson
(74) *Attorney, Agent, or Firm* — Baker Botts, LLP

(57) ABSTRACT

The disclosure provides an HVAC data processing and communication network and a method of manufacturing the same. In an embodiment, the network includes a system device and a subnet controller. The system device is coupled to a data bus and configured to locally store feature or parameter data related to an operation of the system device. The subnet controller is configured to publish a message via the data bus directing the device to publish a message including the feature or parameter data to the network.

20 Claims, 9 Drawing Sheets

(56) References Cited

U.S. PATENT DOCUMENTS

| | | |
|---|---|---|
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,042,997 A | 8/1991 | Rhodes |
| 5,058,388 A | 10/1991 | Shaw et al. |
| 5,103,896 A | 4/1992 | Saga |
| 5,105,366 A | 4/1992 | Beckey |
| 5,115,967 A | 5/1992 | Wedekind |
| 5,180,102 A | 1/1993 | Gilbert et al. |
| 5,181,653 A | 1/1993 | Foster et al. |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,276,630 A | 1/1994 | Baldwin et al. |
| 5,277,036 A | 1/1994 | Dieckmann et al. |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,355,323 A | 10/1994 | Bae |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,513,324 A | 4/1996 | Dolin, Jr. et al. |
| 5,515,267 A | 5/1996 | Alsenz |
| 5,520,328 A | 5/1996 | Bujak, Jr. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown, Jr. et al. |
| 5,544,809 A | 8/1996 | Keating et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,369 A | 3/1997 | Sato et al. |
| 5,617,282 A | 4/1997 | Rall et al. |
| 5,628,201 A | 5/1997 | Bahel et al. |
| 5,630,325 A | 5/1997 | Bahel et al. |
| 5,634,590 A | 6/1997 | Gorski et al. |
| 5,675,830 A | 10/1997 | Satula |
| 5,684,717 A | 11/1997 | Beilfuss et al. |
| 5,699,243 A | 12/1997 | Eckel et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,786,993 A | 7/1998 | Frutiger et al. |
| 5,787,027 A | 7/1998 | Dolan et al. |
| 5,791,332 A | 8/1998 | Thompson et al. |
| 5,802,485 A | 9/1998 | Koelle et al. |
| 5,809,063 A | 9/1998 | Ashe et al. |
| 5,809,556 A | 9/1998 | Fujisawa et al. |
| 5,816,492 A | 10/1998 | Charles et al. |
| 5,818,347 A | 10/1998 | Dolan et al. |
| 5,819,845 A | 10/1998 | Ryu et al. |
| 5,826,038 A | 10/1998 | Nakazumi |
| 5,829,674 A | 11/1998 | Vanostrand et al. |
| 5,841,654 A | 11/1998 | Verissimo et al. |
| 5,848,887 A | 12/1998 | Zabielski et al. |
| 5,854,744 A | 12/1998 | Zeng et al. |
| 5,856,972 A | 1/1999 | Riley et al. |
| 5,860,411 A | 1/1999 | Thompson et al. |
| 5,860,473 A | 1/1999 | Seiden |
| 5,862,411 A | 1/1999 | Kay et al. |
| 5,864,581 A | 1/1999 | Alger-Meunier et al. |
| 5,873,519 A | 2/1999 | Beilfuss |
| 5,878,236 A | 3/1999 | Kleineberg et al. |
| 5,883,627 A | 3/1999 | Pleyer |
| 5,892,690 A | 4/1999 | Boatman et al. |
| 5,896,304 A | 4/1999 | Tiemann et al. |
| 5,900,674 A | 5/1999 | Wojnarowski et al. |
| 5,903,454 A | 5/1999 | Hoffberg et al. |
| 5,912,877 A | 6/1999 | Shirai et al. |
| 5,914,453 A | 6/1999 | James et al. |
| 5,915,101 A | 6/1999 | Kleineberg et al. |
| 5,927,398 A * | 7/1999 | Maciulewicz ................ 165/209 |
| 5,930,249 A | 7/1999 | Stademann et al. |
| 5,933,655 A | 8/1999 | Vrabec et al. |
| 5,934,554 A | 8/1999 | Charles et al. |
| 5,937,942 A | 8/1999 | Bias et al. |
| 5,946,209 A | 8/1999 | Eckel et al. |
| 5,971,597 A | 10/1999 | Baldwin et al. |
| 5,973,594 A | 10/1999 | Baldwin et al. |
| 5,983,646 A | 11/1999 | Grothe et al. |
| 5,993,195 A | 11/1999 | Thompson |
| 6,006,142 A | 12/1999 | Seem et al. |
| 6,011,821 A | 1/2000 | Sauer et al. |
| 6,021,252 A | 2/2000 | Faris et al. |
| 6,028,864 A | 2/2000 | Marttinen et al. |
| 6,032,178 A | 2/2000 | Bacigalupo et al. |
| 6,035,024 A | 3/2000 | Stumer |
| 6,046,410 A | 4/2000 | Wojnarowski et al. |
| 6,049,817 A | 4/2000 | Schoen et al. |

(56) References Cited

U.S. PATENT DOCUMENTS

| | | | |
|---|---|---|---|
| 6,053,416 A | 4/2000 | Specht et al. |
| 6,061,603 A | 5/2000 | Papadopoulos et al. |
| 6,078,660 A | 6/2000 | Burgess |
| 6,082,894 A | 7/2000 | Batko et al. |
| 6,092,280 A | 7/2000 | Wojnarowski |
| 6,095,674 A | 8/2000 | Verissimo et al. |
| 6,098,116 A | 8/2000 | Nixon et al. |
| 6,101,824 A | 8/2000 | Meyer et al. |
| 6,110,260 A | 8/2000 | Kubokawa |
| 6,138,227 A | 10/2000 | Thewes et al. |
| 6,141,595 A | 10/2000 | Gloudeman et al. |
| 6,145,501 A | 11/2000 | Manohar et al. |
| 6,145,751 A | 11/2000 | Ahmed |
| 6,147,601 A | 11/2000 | Sandelman et al. |
| 6,151,298 A | 11/2000 | Bernhardsson et al. |
| 6,151,529 A | 11/2000 | Batko |
| 6,151,625 A | 11/2000 | Swales et al. |
| 6,151,650 A | 11/2000 | Birzer |
| 6,155,341 A | 12/2000 | Thompson et al. |
| 6,160,477 A | 12/2000 | Sandelman et al. |
| 6,160,484 A | 12/2000 | Spahl et al. |
| 6,160,795 A | 12/2000 | Hosemann |
| 6,167,338 A | 12/2000 | De Wille et al. |
| 6,169,937 B1 | 1/2001 | Peterson |
| 6,177,945 B1 | 1/2001 | Pleyer |
| 6,179,213 B1 | 1/2001 | Gibino et al. |
| 6,182,130 B1 | 1/2001 | Dolin, Jr. et al. |
| 6,188,642 B1 | 2/2001 | Schoniger et al. |
| 6,190,442 B1 | 2/2001 | Redner |
| 6,208,905 B1 | 3/2001 | Giddings et al. |
| 6,208,924 B1 | 3/2001 | Bauer |
| 6,211,782 B1 | 4/2001 | Sandelman et al. |
| 6,216,066 B1 | 4/2001 | Goebel et al. |
| 6,227,191 B1 | 5/2001 | Garloch |
| 6,232,604 B1 | 5/2001 | McDaniel et al. |
| 6,237,113 B1 | 5/2001 | Daiber |
| 6,252,890 B1 | 6/2001 | Alger-Meunier et al. |
| 6,254,009 B1 | 7/2001 | Proffitt et al. |
| 6,266,205 B1 | 7/2001 | Schreck et al. |
| 6,269,127 B1 | 7/2001 | Richards |
| 6,282,454 B1 | 8/2001 | Papadopoulos et al. |
| 6,285,912 B1 | 9/2001 | Ellison et al. |
| 6,292,518 B1 | 9/2001 | Grabb et al. |
| 6,298,376 B1 | 10/2001 | Rosner et al. |
| 6,298,454 B1 | 10/2001 | Schleiss et al. |
| 6,298,551 B1 | 10/2001 | Wojnarowski et al. |
| 6,304,557 B1 | 10/2001 | Nakazumi |
| 6,324,008 B1 | 11/2001 | Baldwin et al. |
| 6,324,854 B1 | 12/2001 | Jayanth |
| 6,336,065 B1 | 1/2002 | Gibson et al. |
| 6,343,236 B1 | 1/2002 | Gibson et al. |
| 6,349,883 B1 * | 2/2002 | Simmons et al. ........... 236/46 R |
| 6,353,775 B1 | 3/2002 | Nichols |
| 6,385,510 B1 | 5/2002 | Hoog et al. |
| 6,390,806 B1 | 5/2002 | Dempsey et al. |
| 6,393,023 B1 | 5/2002 | Shimizu et al. |
| 6,400,996 B1 | 6/2002 | Hoffberg et al. |
| 6,405,104 B1 | 6/2002 | Dougherty |
| 6,408,228 B1 | 6/2002 | Seem et al. |
| 6,411,701 B1 | 6/2002 | Stademann |
| 6,412,435 B1 | 7/2002 | Timmons, Jr. |
| 6,415,395 B1 | 7/2002 | Varma et al. |
| 6,418,507 B1 | 7/2002 | Fackler |
| 6,423,118 B1 | 7/2002 | Becerra et al. |
| 6,424,872 B1 | 7/2002 | Glanzer et al. |
| 6,424,874 B1 | 7/2002 | Cofer |
| 6,429,845 B1 | 8/2002 | Unseld et al. |
| 6,434,715 B1 | 8/2002 | Andersen |
| 6,435,418 B1 | 8/2002 | Toth et al. |
| 6,437,691 B1 | 8/2002 | Sandelman et al. |
| 6,442,952 B2 | 9/2002 | Roh et al. |
| 6,448,896 B1 | 9/2002 | Bankus et al. |
| 6,449,315 B2 | 9/2002 | Richards |
| 6,450,409 B1 | 9/2002 | Rowlette et al. |
| 6,454,177 B1 | 9/2002 | Sasao et al. |
| 6,462,654 B1 | 10/2002 | Sandelman et al. |
| 6,478,084 B1 | 11/2002 | Kumar et al. |
| 6,497,570 B1 | 12/2002 | Sears et al. |
| 6,498,844 B1 | 12/2002 | Stademann |
| 6,504,338 B1 | 1/2003 | Eichorn |
| 6,526,122 B2 | 2/2003 | Matsushita et al. |
| 6,535,123 B2 | 3/2003 | Sandelman et al. |
| 6,535,138 B1 | 3/2003 | Dolan et al. |
| 6,539,489 B1 | 3/2003 | Reinert |
| 6,540,148 B1 | 4/2003 | Salsbury et al. |
| 6,542,462 B1 | 4/2003 | Sohraby et al. |
| 6,543,007 B1 | 4/2003 | Bliley et al. |
| 6,545,660 B1 | 4/2003 | Shen et al. |
| 6,546,008 B1 | 4/2003 | Wehrend |
| 6,554,198 B1 | 4/2003 | Hull et al. |
| 6,560,976 B2 | 5/2003 | Jayanth |
| 6,567,476 B2 | 5/2003 | Kohl et al. |
| 6,572,363 B1 | 6/2003 | Virgil, Jr. et al. |
| 6,574,215 B2 | 6/2003 | Hummel |
| 6,574,234 B1 | 6/2003 | Myer et al. |
| 6,574,581 B1 | 6/2003 | Bohrer et al. |
| 6,575,233 B1 | 6/2003 | Krumnow |
| 6,580,950 B1 | 6/2003 | Johnson et al. |
| 6,587,039 B1 | 7/2003 | Woestemeyer et al. |
| 6,587,739 B1 | 7/2003 | Abrams et al. |
| 6,587,884 B1 | 7/2003 | Papadopoulos et al. |
| 6,595,430 B1 | 7/2003 | Shah |
| 6,600,923 B1 | 7/2003 | Dzuban |
| 6,608,560 B2 | 8/2003 | Abrams |
| 6,609,127 B1 | 8/2003 | Lee et al. |
| 6,615,088 B1 | 9/2003 | Myer et al. |
| 6,615,594 B2 | 9/2003 | Jayanth et al. |
| 6,618,394 B1 | 9/2003 | Hilleary |
| 6,619,555 B2 | 9/2003 | Rosen |
| 6,621,507 B1 | 9/2003 | Shah |
| 6,622,926 B1 | 9/2003 | Sartain et al. |
| 6,628,993 B1 | 9/2003 | Bauer |
| 6,633,781 B1 | 10/2003 | Lee et al. |
| 6,636,771 B1 | 10/2003 | Varma et al. |
| 6,640,145 B2 | 10/2003 | Hoffberg et al. |
| 6,640,890 B1 | 11/2003 | Dage et al. |
| 6,643,689 B2 | 11/2003 | Rode et al. |
| 6,647,317 B2 | 11/2003 | Takai et al. |
| 6,650,949 B1 | 11/2003 | Fera et al. |
| 6,651,034 B1 | 11/2003 | Pander et al. |
| 6,658,373 B2 | 12/2003 | Rossi et al. |
| RE38,406 E | 1/2004 | Faris et al. |
| 6,681,215 B2 | 1/2004 | Jammu |
| 6,688,387 B1 | 2/2004 | Wellington et al. |
| 6,704,688 B2 | 3/2004 | Aslam et al. |
| 6,708,239 B1 | 3/2004 | Ellerbrock et al. |
| 6,715,120 B1 | 3/2004 | Hladik et al. |
| 6,715,302 B2 | 4/2004 | Ferragut, II |
| 6,715,690 B2 | 4/2004 | Hull et al. |
| 6,717,513 B1 | 4/2004 | Sandelman et al. |
| 6,718,384 B2 | 4/2004 | Linzy |
| 6,722,143 B2 | 4/2004 | Moon et al. |
| 6,725,180 B2 | 4/2004 | Mayer et al. |
| 6,725,398 B1 | 4/2004 | Varma et al. |
| 6,728,369 B2 | 4/2004 | Burgess |
| 6,732,191 B1 | 5/2004 | Baker et al. |
| 6,735,196 B1 | 5/2004 | Manzardo |
| 6,735,282 B2 | 5/2004 | Matsushita et al. |
| 6,735,965 B2 | 5/2004 | Moon et al. |
| 6,738,676 B2 | 5/2004 | Hirayama |
| 6,741,915 B2 | 5/2004 | Poth |
| 6,744,771 B1 | 6/2004 | Barber et al. |
| 6,745,106 B2 | 6/2004 | Howard et al. |
| 6,758,050 B2 | 7/2004 | Jayanth et al. |
| 6,758,051 B2 | 7/2004 | Jayanth et al. |
| 6,763,040 B1 | 7/2004 | Hite et al. |
| 6,763,272 B2 | 7/2004 | Knepper |
| 6,765,993 B2 | 7/2004 | Cueman |
| 6,768,732 B1 | 7/2004 | Neuhaus |
| 6,774,786 B1 | 8/2004 | Havekost et al. |
| 6,779,176 B1 | 8/2004 | Chambers, II et al. |
| 6,783,079 B2 | 8/2004 | Carey et al. |
| 6,789,739 B2 | 9/2004 | Rosen |
| 6,791,530 B2 | 9/2004 | Vernier et al. |

(56) References Cited

U.S. PATENT DOCUMENTS

| | | |
|---|---|---|
| 6,795,935 B1 | 9/2004 | Unkle et al. |
| 6,798,341 B1 | 9/2004 | Eckel et al. |
| 6,801,524 B2 | 10/2004 | Eteminan |
| 6,804,564 B2 | 10/2004 | Crispin et al. |
| 6,810,333 B2 | 10/2004 | Adedeji et al. |
| 6,814,299 B1 | 11/2004 | Carey |
| 6,814,660 B1 | 11/2004 | Cavett |
| 6,816,071 B2 | 11/2004 | Conti |
| 6,819,802 B2 | 11/2004 | Higgs et al. |
| 6,822,202 B2 | 11/2004 | Atlas |
| 6,823,680 B2 | 11/2004 | Jayanth |
| 6,824,069 B2 | 11/2004 | Rosen |
| 6,826,454 B2 | 11/2004 | Sulfstede |
| 6,826,590 B1 | 11/2004 | Glanzer et al. |
| 6,832,118 B1 | 12/2004 | Heberlein et al. |
| 6,833,844 B1 | 12/2004 | Shiota et al. |
| 6,840,052 B2 | 1/2005 | Smith et al. |
| 6,842,117 B2 | 1/2005 | Keown |
| 6,842,808 B2 | 1/2005 | Weigl et al. |
| 6,845,918 B2 | 1/2005 | Rotondo |
| 6,850,992 B2 | 2/2005 | Heinrich et al. |
| 6,851,948 B2 | 2/2005 | Dempsey et al. |
| 6,853,291 B1 | 2/2005 | Aisa |
| 6,854,444 B2 | 2/2005 | Plagge et al. |
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Leighton et al. |
| 6,868,900 B2 | 3/2005 | Dage et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |
| 6,956,424 B2 | 10/2005 | Hohnel |
| 6,957,696 B1 | 10/2005 | Krumnow |
| 6,963,288 B1 | 11/2005 | Sokol et al. |
| 6,963,922 B2 | 11/2005 | Papadopoulos et al. |
| 6,965,802 B2 | 11/2005 | Sexton |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |
| 7,022,008 B1 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,029,391 B2 | 4/2006 | Nagaya et al. |
| 7,032,018 B2 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 | 5/2006 | Wimsatt |
| 7,051,282 B2 | 5/2006 | Marcjan |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 | 8/2006 | Pouchak |
| 7,085,626 B2 | 8/2006 | Harrod et al. |
| 7,089,087 B2 | 8/2006 | Dudley |
| 7,089,088 B2 | 8/2006 | Terry et al. |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,099,965 B2 | 8/2006 | Ellerbrock et al. |
| 7,100,382 B2 | 9/2006 | Butler et al. |
| 7,103,000 B1 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |

(56) References Cited

U.S. PATENT DOCUMENTS

| | | |
|---|---|---|
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al |
| 7,213,044 B2 | 5/2007 | Tjong et al. |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |
| 7,222,152 B1 | 5/2007 | Thompson et al. |
| 7,222,493 B2 | 5/2007 | Jayanth et al. |
| 7,222,494 B2 | 5/2007 | Peterson et al. |
| 7,224,366 B2 | 5/2007 | Kessler et al. |
| 7,225,054 B2 | 5/2007 | Amundson et al. |
| 7,225,356 B2 | 5/2007 | Monitzer |
| 7,228,187 B2 | 6/2007 | Ticky et al. |
| 7,232,058 B2 | 6/2007 | Lee |
| 7,233,229 B2 | 6/2007 | Stroupe et al. |
| 7,239,623 B2 | 7/2007 | Burghardt et al. |
| 7,242,988 B1 | 7/2007 | Hoffberg et al. |
| 7,243,004 B2 | 7/2007 | Shah et al. |
| 7,244,294 B2 | 7/2007 | Kates |
| 7,246,753 B2 | 7/2007 | Hull et al. |
| 7,248,576 B2 | 7/2007 | Hoffmann |
| 7,251,534 B2 | 7/2007 | Walls et al. |
| 7,257,813 B1 | 8/2007 | Mayer et al. |
| 7,260,084 B2 | 8/2007 | Saller |
| 7,260,451 B2 | 8/2007 | Takai et al. |
| 7,260,609 B2 | 8/2007 | Fuehrer et al. |
| 7,260,948 B2 | 8/2007 | Jayanth et al. |
| 7,261,241 B2 | 8/2007 | Eoga |
| 7,261,243 B2 | 8/2007 | Butler et al. |
| 7,261,762 B2 | 8/2007 | Kang et al. |
| 7,266,775 B2 | 9/2007 | Patitucci |
| 7,266,960 B2 | 9/2007 | Shah |
| 7,269,962 B2 | 9/2007 | Bachmann |
| 7,272,154 B2 | 9/2007 | Loebig |
| 7,272,452 B2 | 9/2007 | Coogan et al. |
| 7,272,457 B2 | 9/2007 | Glanzer et al. |
| 7,274,972 B2 | 9/2007 | Amundson et al. |
| 7,274,973 B2 | 9/2007 | Nichols et al. |
| 7,277,280 B2 | 10/2007 | Peng |
| 7,277,970 B2 | 10/2007 | Ellerbrock et al. |
| 7,278,103 B1 | 10/2007 | Clark et al. |
| 7,287,062 B2 | 10/2007 | Im et al. |
| 7,287,708 B2 | 10/2007 | Lucas et al. |
| 7,287,709 B2 | 10/2007 | Proffitt et al. |
| 7,289,458 B2 | 10/2007 | Gila et al. |
| 7,292,900 B2 | 11/2007 | Kreidler et al. |
| 7,293,422 B2 | 11/2007 | Parachini et al. |
| 7,295,099 B2 | 11/2007 | Lee et al. |
| 7,296,426 B2 | 11/2007 | Butler et al. |
| 7,299,279 B2 | 11/2007 | Sadaghiany |
| 7,299,996 B2 | 11/2007 | Garrett et al. |
| 7,301,699 B2 | 11/2007 | Kanamori et al. |
| 7,305,495 B2 | 12/2007 | Carter |
| 7,306,165 B2 | 12/2007 | Shah |
| 7,310,559 B2 | 12/2007 | Walko, Jr. |
| 7,313,716 B2 | 12/2007 | Weigl et al. |
| 7,313,923 B2 | 1/2008 | Jayanth et al. |
| 7,315,768 B2 | 1/2008 | Dang et al. |
| 7,317,970 B2 | 1/2008 | Pienta et al. |
| 7,320,110 B2 | 1/2008 | Shah |
| 7,324,874 B2 | 1/2008 | Jung |
| 7,327,376 B2 | 2/2008 | Shen et al. |
| 7,327,815 B1 | 2/2008 | Jurisch |
| 7,330,512 B2 | 2/2008 | Frank et al. |
| 7,331,191 B2 | 2/2008 | He et al. |
| 7,334,161 B2 | 2/2008 | Williams et al. |
| 7,336,650 B2 | 2/2008 | Franz et al. |
| 7,337,369 B2 | 2/2008 | Barthel et al. |
| 7,337,619 B2 | 3/2008 | Hsieh et al. |
| 7,343,226 B2 | 3/2008 | Ehlers et al. |
| 7,346,404 B2 | 3/2008 | Eryurek et al. |
| 7,346,835 B1 | 3/2008 | Lobinger et al. |
| 7,349,761 B1 | 3/2008 | Cruse |
| 7,354,005 B2 | 4/2008 | Carey et al. |
| 7,356,050 B2 | 4/2008 | Reindl et al. |
| 7,359,345 B2 | 4/2008 | Chang et al. |
| 7,360,002 B2 | 4/2008 | Brueckner et al. |
| 7,360,370 B2 | 4/2008 | Shah et al. |
| 7,360,717 B2 | 4/2008 | Shah |
| 7,364,093 B2 | 4/2008 | Garozzo |
| 7,365,812 B2 | 4/2008 | Lee |
| 7,366,498 B2 | 4/2008 | Ko et al. |
| 7,366,944 B2 | 4/2008 | Oshins et al. |
| 7,370,074 B2 | 5/2008 | Alexander et al. |
| 7,377,450 B2 | 5/2008 | Van Ostrand et al. |
| 7,383,158 B2 | 6/2008 | Krocker et al. |
| 7,389,150 B2 | 6/2008 | Inoue et al. |
| 7,389,204 B2 | 6/2008 | Eryurek et al. |
| RE40,437 E | 7/2008 | Rosen et al. |
| 7,392,661 B2 | 7/2008 | Alles |
| 7,395,122 B2 | 7/2008 | Kreidler et al. |
| 7,395,137 B2 | 7/2008 | Robinson |
| 7,403,128 B2 | 7/2008 | Scuka et al. |
| 7,412,839 B2 | 8/2008 | Jayanth |
| 7,412,842 B2 | 8/2008 | Pham |
| D578,026 S | 10/2008 | Roher et al. |
| 7,433,740 B2 | 10/2008 | Hesse et al. |
| 7,434,744 B2 | 10/2008 | Garozzo et al. |
| 7,436,292 B2 | 10/2008 | Rourke et al. |
| 7,436,293 B2 | 10/2008 | Rourke et al. |
| 7,436,296 B2 | 10/2008 | Rourke et al. |
| 7,436,400 B2 | 10/2008 | Cheng |
| 7,437,198 B2 | 10/2008 | Iwaki |
| 7,441,094 B2 | 10/2008 | Stephens |
| 7,451,937 B2 | 11/2008 | Flood et al. |
| 7,454,269 B1 | 11/2008 | Dushane et al. |
| 7,455,240 B2 | 11/2008 | Chapman, Jr. et al. |
| 7,460,933 B2 | 12/2008 | Chapman, Jr. et al. |
| 7,587,459 B2 * | 9/2009 | Wewalaarachchi et al. .. 709/206 |
| 7,870,080 B2 * | 1/2011 | Budike, Jr. .................. 705/412 |
| 2001/0034586 A1 | 10/2001 | Ewert et al. |
| 2001/0048376 A1 | 12/2001 | Maeda et al. |
| 2002/0022894 A1 | 2/2002 | Eryurek et al. |
| 2002/0026476 A1 | 2/2002 | Miyazaki et al. |
| 2002/0072814 A1 | 6/2002 | Schuler et al. |
| 2002/0091784 A1 | 7/2002 | Baker et al. |
| 2002/0123896 A1 | 9/2002 | Diez et al. |
| 2002/0163427 A1 | 11/2002 | Eryurek et al. |
| 2002/0190242 A1 | 12/2002 | Iillie et al. |
| 2003/0058863 A1 | 3/2003 | Oost |
| 2003/0078677 A1 | 4/2003 | Hull et al. |
| 2003/0108064 A1 | 6/2003 | Bilke et al. |
| 2003/0115177 A1 | 6/2003 | Takanabe et al. |
| 2003/0229784 A1 | 12/2003 | Cuellar et al. |
| 2004/0039478 A1 | 2/2004 | Kiesel et al. |
| 2004/0095237 A1 | 5/2004 | Chen et al. |
| 2004/0104942 A1 | 6/2004 | Weigel |
| 2004/0107717 A1 | 6/2004 | Yoon et al. |
| 2004/0111186 A1 | 6/2004 | Rossi et al. |
| 2004/0117330 A1 | 6/2004 | Ehlers et al. |
| 2004/0139038 A1 | 7/2004 | Ehlers et al. |
| 2004/0143360 A1 | 7/2004 | Kiesel et al. |
| 2004/0146008 A1 | 7/2004 | Conradt et al. |
| 2004/0156360 A1 | 8/2004 | Sexton et al. |

(56) References Cited

U.S. PATENT DOCUMENTS

| | | |
|---|---|---|
| 2004/0159112 A1 | 8/2004 | Jayanth et al. |
| 2004/0189590 A1 | 9/2004 | Mehaffey et al. |
| 2004/0204775 A1 | 10/2004 | Keyes et al. |
| 2004/0205781 A1 | 10/2004 | Hill et al. |
| 2004/0206096 A1 | 10/2004 | Jayanth |
| 2004/0210348 A1 | 10/2004 | Imhof et al. |
| 2004/0218591 A1 | 11/2004 | Ogawa et al. |
| 2004/0236471 A1 | 11/2004 | Poth |
| 2004/0266491 A1 | 12/2004 | Howard et al. |
| 2004/0267790 A1 | 12/2004 | Pak et al. |
| 2005/0005249 A1 | 1/2005 | Hill et al. |
| 2005/0007249 A1 | 1/2005 | Eryurek et al. |
| 2005/0010759 A1 | 1/2005 | Wakiyama |
| 2005/0033707 A1 | 2/2005 | Ehlers et al. |
| 2005/0034023 A1 | 2/2005 | Maturana et al. |
| 2005/0041633 A1 | 2/2005 | Roeser et al. |
| 2005/0054381 A1 | 3/2005 | Lee et al. |
| 2005/0055427 A1 | 3/2005 | Frutiger et al. |
| 2005/0068978 A1 | 3/2005 | Sexton et al. |
| 2005/0076150 A1 | 4/2005 | Lee et al. |
| 2005/0080879 A1 | 4/2005 | Kim et al. |
| 2005/0081156 A1 | 4/2005 | Clark et al. |
| 2005/0081157 A1 | 4/2005 | Clark et al. |
| 2005/0096872 A1 | 5/2005 | Blevins et al. |
| 2005/0109048 A1 | 5/2005 | Lee |
| 2005/0115254 A1 | 6/2005 | Knight et al. |
| 2005/0116023 A1 | 6/2005 | Amundson et al. |
| 2005/0118996 A1 | 6/2005 | Lee et al. |
| 2005/0119766 A1 | 6/2005 | Amundson et al. |
| 2005/0120012 A1 | 6/2005 | Poth et al. |
| 2005/0125495 A1 | 6/2005 | Tjong et al. |
| 2005/0143138 A1 | 6/2005 | Lee et al. |
| 2005/0145705 A1 | 7/2005 | Shah et al. |
| 2005/0150967 A1 | 7/2005 | Chapman, Jr. et al. |
| 2005/0161517 A1 | 7/2005 | Helt et al. |
| 2005/0166610 A1 | 8/2005 | Jayanth |
| 2005/0176410 A1 | 8/2005 | Brooking et al. |
| 2005/0193155 A1 | 9/2005 | Fujita |
| 2005/0223339 A1 | 10/2005 | Lee |
| 2005/0229610 A1 | 10/2005 | Park et al. |
| 2005/0235661 A1 | 10/2005 | Pham |
| 2005/0235662 A1 | 10/2005 | Pham |
| 2005/0235663 A1 | 10/2005 | Pham |
| 2005/0235666 A1 | 10/2005 | Springer et al. |
| 2005/0258257 A1 | 11/2005 | Thurman, Jr. et al. |
| 2005/0270151 A1 | 12/2005 | Winick |
| 2005/0278071 A1 | 12/2005 | Durham, III |
| 2005/0280364 A1 | 12/2005 | Omura et al. |
| 2005/0281368 A1 | 12/2005 | Droba et al. |
| 2005/0288823 A1 | 12/2005 | Hesse et al. |
| 2006/0006244 A1 | 1/2006 | Morrow et al. |
| 2006/0021358 A1 | 2/2006 | Nallapa |
| 2006/0021359 A1 | 2/2006 | Hur et al. |
| 2006/0030954 A1 | 2/2006 | Bergman et al. |
| 2006/0041898 A1 | 2/2006 | Potyrailo et al. |
| 2006/0048064 A1 | 3/2006 | Vronay |
| 2006/0058924 A1 | 3/2006 | Shah |
| 2006/0090142 A1 | 4/2006 | Glasgow et al. |
| 2006/0090483 A1 | 5/2006 | Kim et al. |
| 2006/0091227 A1 | 5/2006 | Attridge, Jr. |
| 2006/0092977 A1 | 5/2006 | Bai et al. |
| 2006/0106791 A1 | 5/2006 | Morrow et al. |
| 2006/0108432 A1 | 5/2006 | Mattheis |
| 2006/0111816 A1 | 5/2006 | Spalink et al. |
| 2006/0130497 A1 | 6/2006 | Kang et al. |
| 2006/0144055 A1 | 7/2006 | Ahn |
| 2006/0144232 A1 | 7/2006 | Kang et al. |
| 2006/0149414 A1 | 7/2006 | Archacki, Jr. et al. |
| 2006/0150027 A1 | 7/2006 | Paden |
| 2006/0153247 A1 | 7/2006 | Stumer |
| 2006/0155398 A1 | 7/2006 | Hoffberg et al. |
| 2006/0158051 A1 | 7/2006 | Bartlett et al. |
| 2006/0159007 A1 | 7/2006 | Frutiger et al. |
| 2006/0168522 A1 | 7/2006 | Bala |
| 2006/0186214 A1 | 8/2006 | Simon et al. |
| 2006/0190138 A1 | 8/2006 | Stone et al. |
| 2006/0192021 A1 | 8/2006 | Schultz et al. |
| 2006/0196953 A1 | 9/2006 | Simon et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0202978 A1 | 9/2006 | Lee et al. |
| 2006/0206220 A1 | 9/2006 | Amundson |
| 2006/0209208 A1 | 9/2006 | Kim et al. |
| 2006/0219799 A1 | 10/2006 | Schultz et al. |
| 2006/0229090 A1 | 10/2006 | LaDue |
| 2006/0235548 A1 | 10/2006 | Gaudette |
| 2006/0236351 A1 | 10/2006 | Ellerbrock et al. |
| 2006/0239296 A1 | 10/2006 | Jinzaki et al. |
| 2006/0248233 A1 | 11/2006 | Park et al. |
| 2006/0276917 A1 | 12/2006 | Li et al. |
| 2007/0005191 A1 | 1/2007 | Sloup et al. |
| 2007/0008116 A1 | 1/2007 | Bergman et al. |
| 2007/0012052 A1 | 1/2007 | Butler et al. |
| 2007/0013534 A1 | 1/2007 | DiMaggio |
| 2007/0014233 A1 | 1/2007 | Oguro et al. |
| 2007/0016311 A1 | 1/2007 | Bergman et al. |
| 2007/0016476 A1 | 1/2007 | Hoffberg et al. |
| 2007/0025368 A1 | 2/2007 | Ha et al. |
| 2007/0032909 A1 | 2/2007 | Tolbert, Jr. et al. |
| 2007/0033310 A1 | 2/2007 | Kweon |
| 2007/0040040 A1 | 2/2007 | Mueller |
| 2007/0043478 A1 | 2/2007 | Ehlers et al. |
| 2007/0045429 A1 | 3/2007 | Chapman, Jr. et al. |
| 2007/0045431 A1 | 3/2007 | Chapman, Jr. et al. |
| 2007/0045442 A1 | 3/2007 | Chapman, Jr. et al. |
| 2007/0051818 A1 | 3/2007 | Atlas |
| 2007/0055407 A1 | 3/2007 | Goldberg et al. |
| 2007/0067496 A1 | 3/2007 | Deiretsbacher et al. |
| 2007/0073973 A1 | 3/2007 | Hazay |
| 2007/0080235 A1 | 4/2007 | Fulton, Jr. |
| 2007/0083721 A1 | 4/2007 | Grinspan |
| 2007/0084937 A1 | 4/2007 | Ahmed |
| 2007/0088883 A1 | 4/2007 | Wakabayashi |
| 2007/0089090 A1 | 4/2007 | Riedl et al. |
| 2007/0090199 A1 | 4/2007 | Hull et al. |
| 2007/0093226 A1 | 4/2007 | Foltyn et al. |
| 2007/0102149 A1 | 5/2007 | Kates |
| 2007/0109975 A1 | 5/2007 | Reckamp et al. |
| 2007/0113247 A1 | 5/2007 | Kwak |
| 2007/0119957 A1 | 5/2007 | Kates |
| 2007/0119958 A1 | 5/2007 | Kates |
| 2007/0129820 A1 | 6/2007 | Glanzer et al. |
| 2007/0129825 A1 | 6/2007 | Kargenian |
| 2007/0129826 A1 | 6/2007 | Kreidler et al. |
| 2007/0129917 A1 | 6/2007 | Blevins et al. |
| 2007/0130834 A1 | 6/2007 | Kande et al. |
| 2007/0130969 A1 | 6/2007 | Peterson et al. |
| 2007/0135692 A1 | 6/2007 | Hwang et al. |
| 2007/0135946 A1 | 6/2007 | Sugiyama et al. |
| 2007/0136669 A1 | 6/2007 | Kwon et al. |
| 2007/0136687 A1 | 6/2007 | Pak |
| 2007/0138307 A1 | 6/2007 | Khoo |
| 2007/0138308 A1 | 6/2007 | Schultz et al. |
| 2007/0143704 A1 | 6/2007 | Laird-McConnell |
| 2007/0143707 A1 | 6/2007 | Yun et al. |
| 2007/0158442 A1 | 7/2007 | Chapman, Jr. et al. |
| 2007/0168887 A1 | 7/2007 | Lee |
| 2007/0177505 A1 | 8/2007 | Charrua et al. |
| 2007/0191024 A1 | 8/2007 | Kim et al. |
| 2007/0192731 A1 | 8/2007 | Townsend et al. |
| 2007/0204637 A1 | 9/2007 | Fujii et al. |
| 2007/0205297 A1 | 9/2007 | Finkam et al. |
| 2007/0208461 A1 | 9/2007 | Chase |
| 2007/0208549 A1 | 9/2007 | Blevins et al. |
| 2007/0213853 A1 | 9/2007 | Glanzer et al. |
| 2007/0223500 A1 | 9/2007 | Lee et al. |
| 2007/0225868 A1 | 9/2007 | Terlson et al. |
| 2007/0225869 A1 | 9/2007 | Amundson et al. |
| 2007/0237032 A1 | 10/2007 | Rhee et al. |
| 2007/0238413 A1 | 10/2007 | Coutts |
| 2007/0239658 A1 | 10/2007 | Cunningham et al. |
| 2007/0240226 A1 | 10/2007 | Song et al. |

(56) References Cited

U.S. PATENT DOCUMENTS

| | | |
|---|---|---|
| 2007/0241203 A1 | 10/2007 | Wagner et al. |
| 2007/0242058 A1 | 10/2007 | Yamada |
| 2007/0245306 A1 | 10/2007 | Dameshek et al. |
| 2007/0257120 A1 | 11/2007 | Chapman, Jr. et al. |
| 2007/0260978 A1 | 11/2007 | Oh et al. |
| 2007/0266329 A1 | 11/2007 | Gaudette |
| 2007/0271521 A1 | 11/2007 | Harriger et al. |
| 2007/0274093 A1 | 11/2007 | Haim et al. |
| 2007/0277013 A1 | 11/2007 | Rexha et al. |
| 2007/0278320 A1 | 12/2007 | Lunacek et al. |
| 2007/0284452 A1 | 12/2007 | Butler et al. |
| 2007/0299857 A1 | 12/2007 | Gwozdz et al. |
| 2007/0300064 A1 | 12/2007 | Isaacs et al. |
| 2008/0004727 A1 | 1/2008 | Glanzer et al. |
| 2008/0005428 A1 | 1/2008 | Maul et al. |
| 2008/0006709 A1 | 1/2008 | Ashworth et al. |
| 2008/0031147 A1 | 2/2008 | Fieremans et al. |
| 2008/0040351 A1 | 2/2008 | Jin et al. |
| 2008/0048045 A1 | 2/2008 | Butler et al. |
| 2008/0054082 A1 | 3/2008 | Evans et al. |
| 2008/0055190 A1 | 3/2008 | Lee |
| 2008/0057872 A1 | 3/2008 | McFarland et al. |
| 2008/0059682 A1 | 3/2008 | Cooley et al. |
| 2008/0062892 A1 | 3/2008 | Dodgen et al. |
| 2008/0063006 A1 | 3/2008 | Nichols |
| 2008/0065926 A1 | 3/2008 | Poth et al. |
| 2008/0072704 A1 | 3/2008 | Clark et al. |
| 2008/0073440 A1 | 3/2008 | Butler et al. |
| 2008/0077884 A1 | 3/2008 | Patitucci |
| 2008/0077886 A1 | 3/2008 | Eichner |
| 2008/0083009 A1 | 4/2008 | Kaler et al. |
| 2008/0097651 A1 | 4/2008 | Shah et al. |
| 2008/0104189 A1 | 5/2008 | Baker et al. |
| 2008/0114500 A1 | 5/2008 | Hull et al. |
| 2008/0128523 A1 | 6/2008 | Hoglund et al. |
| 2008/0133033 A1 | 6/2008 | Wolff et al. |
| 2008/0133060 A1 | 6/2008 | Hoglund et al. |
| 2008/0133061 A1 | 6/2008 | Hoglund et al. |
| 2008/0134087 A1 | 6/2008 | Hoglund et al. |
| 2008/0134098 A1 | 6/2008 | Hoglund et al. |
| 2008/0157936 A1 | 7/2008 | Ebrom |
| 2008/0161977 A1 | 7/2008 | Takach et al. |
| 2008/0161978 A1 | 7/2008 | Shah |
| 2008/0168356 A1 | 7/2008 | Eryurek et al. |
| 2008/0183335 A1 | 7/2008 | Poth et al. |
| 2008/0185976 A1 | 8/2008 | Dickey et al. |
| 2008/0186160 A1 | 8/2008 | Kim et al. |
| 2008/0195254 A1 | 8/2008 | Jung et al. |
| 2008/0195687 A1 | 8/2008 | Jung et al. |
| 2008/0215987 A1 | 9/2008 | Alexander et al. |
| 2008/0217418 A1 | 9/2008 | Helt et al. |
| 2008/0223944 A1 | 9/2008 | Helt et al. |
| 2008/0256475 A1 | 10/2008 | Amundson et al. |
| 2008/0264085 A1 | 10/2008 | Perry et al. |
| 2008/0294274 A1 | 11/2008 | Laberge et al. |
| 2008/0294932 A1 | 11/2008 | Oshins et al. |
| 2009/0001180 A1 | 1/2009 | Siddaramanna et al. |
| 2009/0001182 A1 | 1/2009 | Siddaramanna et al. |
| 2009/0049847 A1 | 2/2009 | Butler et al. |
| 2009/0055002 A1 | 2/2009 | Anderson et al. |
| 2009/0261174 A1 | 10/2009 | Butler et al. |
| 2010/0168924 A1* | 7/2010 | Tessier et al. .............. 700/278 |

OTHER PUBLICATIONS

Related case U.S. Appl. No. 12/603,450, filed on Oct. 21, 2009 to Wojciech Grohman, entitled "Alarm and Diagnostics System and Method for a Distributed-Architecture Heating, Ventilation and Air Conditioning Network"

Related case U.S. Appl. No. 12/603,382, filed on Oct. 21, 2009 to Wojciech Grohman, entitled "Device Abstraction System and Method for a Distributed-Architecture Heating, Ventilation and Air Conditioning System"

Related case U.S. Appl. No. 12/603,504, filed on Oct. 21, 2009 to Amanda Filbeck et al., entitled "System and Method of Use for a User Interface Dashboard of a Heating, Ventilation and Air Conditioning Network"

Related case U.S. Appl. No. 12/603,449, filed on Oct. 21, 2009 to Wojciech Grohman et al., entitled "System and Method of Use for a User Interface Dashboard of a Heating, Ventilation and Air Conditioning Network"

Related case U.S. Appl. No. 12/603,460, filed on Oct. 21, 2009 to Wojciech Grohman et al., entitled "System and Method of use for a User Interface Dashboard of a Heating, Ventilation and Air Conditioning Network"

Related case U.S. Appl. No. 12/603,526, filed on Oct. 21, 2009 to Wojciech Grohman et al., entitled "Communication Protocol System and Methof for a Distributed-Architecture Heating, Ventilation and Air Conditioning Network K"

Related case U.S. Appl. No. 12/603,532, filed on Oct. 21, 2009 to Wojciech Grohman, entitled "Communication Protocol System and Method for a Distributed-Architecture Heating, Ventilation and Air Conditioning Network"

Related case U.S. Appl. No. 12/603,475, filed on Oct. 21, 2009 to Suresh Kumar Devineni et al., entitled "System and Method of Use for a User Interface Dashboard of a Heating, Ventilation and Air Conditioning Network"

Related case U.S. Appl. No. 12/603,473, filed on Oct. 21, 2009 to Wojciech Grohman et al., entitled "System and Method for Zoning a Distributed-Architecture Heating, Ventilation and Air Conditioning Network"

Related case U.S. Appl. No. 12/603,407, filed on Oct. 21, 2009 to Amanda Filbeck et al., entitled "System and Method for Zoning a Distributed-Architecture Heating, Ventilation and Air Conditioning Network"

Related case U.S. Appl. No. 12/603,496, filed on Oct. 21, 2009 to Wojciech Grohman et al., entitled "Device Abstraction System and Method for a Distributed-Architecture Heating, Ventilation and Air Conditioning System"

Related case U.S. Appl. No. 12/603,482, filed on Oct. 21, 2009 to Muhammad Mirza et al., entitled "System and Method of Use for a User Interface Dashboard of a Heating, Ventilation and Air Conditioning Network"

Related case U.S. Appl. No. 12/603,488, filed on Oct. 21, 2009 to Muhammad Mirza et al., entitled "System and Method of Use for a User Interface Dashboard of a Heating, Ventilation and Air Conditioning Network"

Related case U.S. Appl. No. 12/603,495, filed on Oct. 21, 2009 to Thomas Pavlak et al., entitled "System and Method of Use for a User Interface Dashboard of a Heating, Ventilation and Air Conditioning Network"

Related case U.S. Appl. No. 12/603,497, filed on Oct. 21, 2009 to Muhammad Mirza et al., entitled "System and Method of Use for a User Interface Dashboard of a Heating, Ventilation and Air Conditioning Network"

Related case U.S. Appl. No. 12/603,431, filed on Oct. 21, 2009 to Wojciech Grohman et al., entitled "General Control Technique in a Heating, Ventilation and Air Conditioning Network"

Related case U.S. Appl. No. 12/603,502, filed on Oct. 21, 2009 to Jacob Jennings et al., entitled "System and Method of Use for a User Interface Dashboard of a Heating, Ventilation and Air Conditioning Network"

Related case U.S. Appl. No. 12/603,489, filed on Oct. 21, 2009 to Wojciech Grohman et al., entitled "System and Method for Zoning a Distributed-Architecture Heating, Ventilation and Air Conditioning Network"

Related case U.S. Appl. No. 12/603,527, filed on Oct. 21, 2009 to Darko Hadzidedic, entitled "Memory Recovery Scheme and Data Structure in a Heating, Ventilation and Air Conditioning Network"

Related case U.S. Appl. No. 12/603,479, filed on Oct. 21, 2009 to Wojciech Grohman et al., entitled "Device Abstraction System and Method for a Distributed-Architecture Heating, Ventilation and Air Conditioning System"

(56) References Cited

OTHER PUBLICATIONS

Related case U.S. Appl. No. 12/603,536, filed on Oct. 21, 2009 to Timothy Wallaert et al., entitled. "Communication Protocol System and Method for a Distributed-Architecture Heating, Ventilation and Air Conditioning Network"
Related case U.S. Appl. No. 12/603,509, filed on Oct. 21, 2009 to Timothy Wallaert et al., entitled "System and Method of Use for a User Interface Dashboard of a Heating, Ventilation and Air Conditioning Network"
Related case U.S. Appl. No. 12/603,512, filed on Oct. 21, 2009 to Wojciech Grohman et al., entitled "Programming and Configuration in a Heating, Ventilation and Air Conditioning Network"
Related case U.S. Appl. No. 12/603,464, filed on Oct. 21, 2009 to Wojciech Grohman et al., entitled "Alarm and Diagnostics System and Method for a Distributed-Architecture Heating, Ventilation and Air Conditioning Network"
Related case U.S. Appl. No. 12/603,528, filed on Oct. 21, 2009 to Wojciech Grohman et al., entitled "Memory Recovery Scheme and Data Structure in a Heating, Ventilation and Air Conditioning Network"
Related case U.S. Appl. No. 12/603,525, filed on Oct. 21, 2009 to Wojciech Grohman et al., entitled "Method of Controlling Equipment in a Heating, Ventilation and Air Conditioning Network"
Related case U.S. Appl. No. 12/603,520, filed on Oct. 21, 2009 to Darko Hadzidedic et al., entitled "Alarm and Diagnostics System and Method for a Distributed-Architecture Heating, Ventilation and Air Conditioning Network"
Related case U.S. Appl. No. 12/603,539, filed on Oct. 21, 2009 to Wojciech Grohman et al., entitled "Communication Protocol System and Method for a Distributed-Architecture Heating, Ventilation and Air Conditioning Network"
Related case U.S. Appl. No. 12/603,420, filed on Oct. 21, 2009 to Darko Hadzidedic et al., entitled "Alarm and Diagnostics System and Method for a Distributed-Architecture Heating, Ventilation and Air Conditioning Network"
Related case U.S. Appl. No. 12/603,483, filed on Oct. 21, 2009 to Wojciech Grohman et al., entitled "Device Abstraction System and Method for a Distributed-Architecture Heating, Ventilation and Air Conditioning System"
Related case U.S. Appl. No. 12/603,514, filed on Oct. 21, 2009 to Thomas Pavlak et al., entitled "System and Method of Use for a User Interface Dashboard of a Heating, Ventilation and Air Conditioning Network"
Related case U.S. Appl. No. 12/603,515, filed on Oct. 21, 2009 to Wojciech Grohman et al., entitled "Alarm and Diagnostics System and Method for a Distributed-Architecture Heating, Ventilation and Air Conditioning Network"
Related case U.S. Appl. No. 12/603,490, filed on Oct. 21, 2009 to Wojciech Grohman, entitled "System Recovery in a Heating, Ventilation and Air Conditioning Network"
Related case U.S. Appl. No. 12/603,523, filed on Oct. 21, 2009 to Wojciech Grohman et al., entitled "Alarm and Diagnostics System and Method for a Distributed-Architecture Heating, Ventilation and Air Conditioning"
Related case U.S. Appl. No. 12/603,493, filed on Oct. 21, 2009 to Wojciech Grohman et al., entitled "System Recovery in a Heating, Ventilation and Air Conditioning Network"
Related case U.S. Appl. No. 12/603,547, filed on Oct. 21, 2009 to Wojciech Grohman, entitled "Communication Protocol System and Method for a Distributed-Architecture Heating, Ventilation and Air Conditioning Network"
Related case U.S. Appl. No. 12/603,531, filed on Oct. 21, 2009 to Wojciech Grohman, entitled "Memory Recovery Scheme and Data Structure in a Heating, Ventilation and Air Conditioning Network"
Related case U.S. Appl. No. 12/603,555, filed on Oct. 21, 2009 to Wojciech Grohman, entitled "Communication Protocol System and Method for a Distributed-Architecture Heating, Ventilation and Air Conditioning Network"
Related case U.S. Appl. No. 12/603,562, filed on Oct. 21, 2009 to Wojciech Grohman et al., entitled "Communication Protocol System and Method for a Distributed-Architecture Heating, Ventilation and Air Conditioning Network"
Related case U.S. Appl. No. 12/603,566, filed on Oct. 21, 2009 to Wojciech Grohman, entitled "Communication.Protocol System and Method for a Distributed-Architecture Heating, Ventilation and Air Conditioning Network"
Related case U.S. Appl. No. 12/603,451, filed on Oct. 21, 2009 to Timothy Wallaert, entitled "Alarm and Diagnostics System and Method for a Distributed-Architecture Heating, Ventilation and Air Conditioning Network"
Related case U.S. Appl. No. 12/603,553, filed on Oct. 21, 2009 to Wojciech Grohman et al., entitled "Communication Protocol System and Method for a Distributed-Architecture Heating, Ventilation and Air Conditioning Network"
Related case U.S. Appl. No. 12/603,487, filed on Oct. 21, 2009 to Wojciech Grohman, entitled "System Recovery in a Heating, Ventilation and Air Conditioning Network"
Related case U.S. Appl. No. 12/603,558, filed on Oct. 21, 2009 to Wojciech Grohman, entitled "Communication Protocol System and Method for a Distributed-Architecture Heating, Ventilation and Air Conditioning Network"
Related case U.S. Appl. No. 12/603,468, filed on Oct. 21, 2009 to Wojciech Grohman et al., entitled "Programming and Configuration in a Heating, Ventilation and Air Conditioning Network"
Related case U.S. Appl. No. 12/603,560, filed on Oct. 21, 2009 to Wojciech Grohman, entitled "Communication Protocol System and Method for a Distributed-Architecture Heating, Ventilation and Air Conditioning Network"
Related case U.S. Appl. No. 12/603,519, filed on Oct. 21, 2009 to Thomas Pavlak, entitled "System and Method of Use for a User Interface Dashboard of a Heating, Ventilation and Air Conditioning Network"
Related case U.S. Appl. No. 12/603,499, filed on Oct. 21, 2009 to Jimmy Curry et al., entitled "Alarm and Diagnostics System and Method for a Distributed-Architechture Heating, Ventilation and Air Conditioning Network"
Related case U.S. Appl. No. 12/603,534, filed on Oct. 21, 2009 to Timothy Wallaert et al., entitled "Flush Wall Mount Thermostat and In-Set Mounting Plate for a Heating, Ventilation and Air Conditioning System"
Related case U.S. Appl. No. 29/345,748, filed on Oct. 21, 2009 to Timothy Wallaert et al., entitled "Thin Cover Plate for an Electronic System Controller"
Related case U.S. Appl. No. 29/345,747, filed on Oct. 21, 2009 to Timothy Wallaert et al., entitled "Thin Cover Plate for an Electronic System Controller"

* cited by examiner

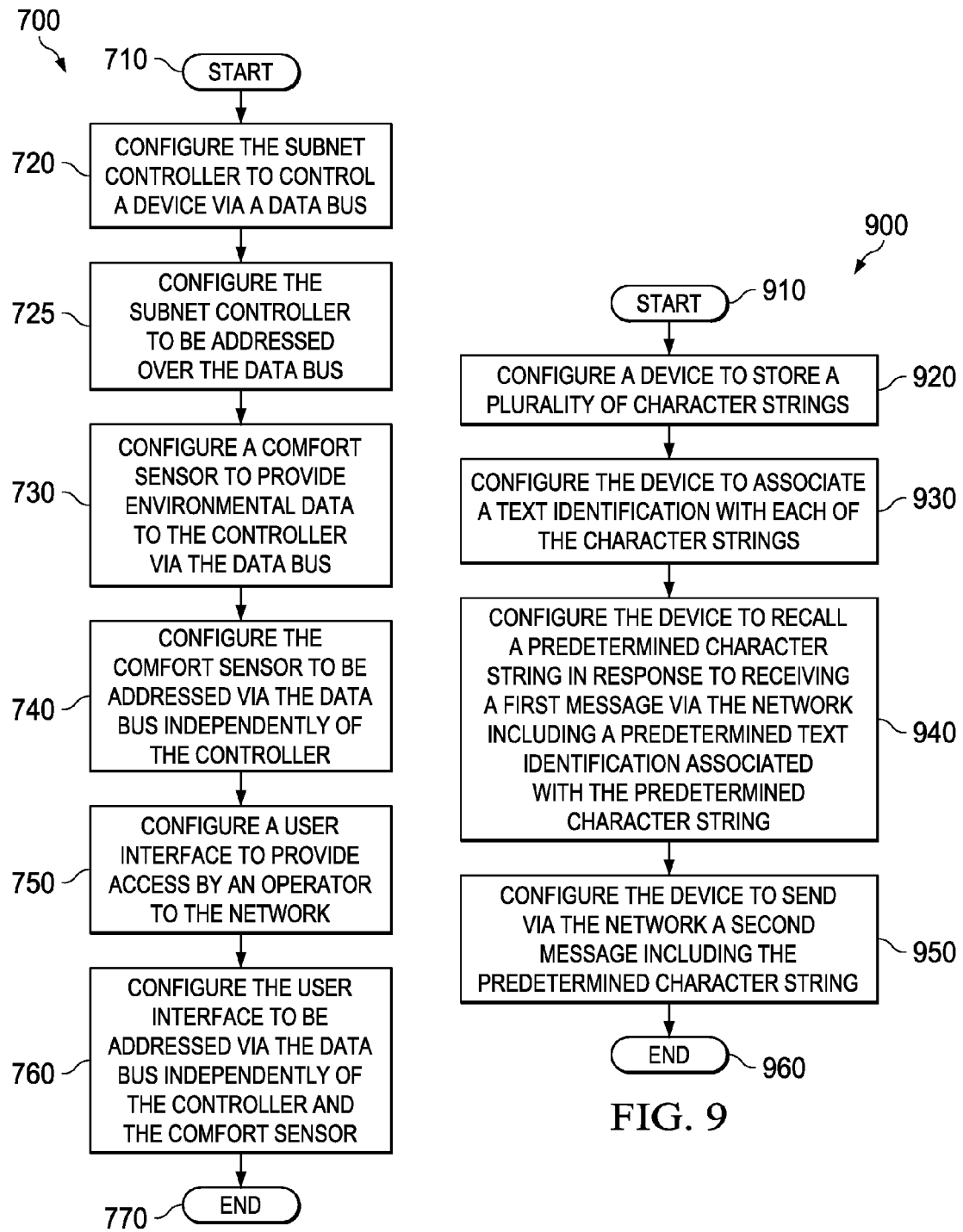

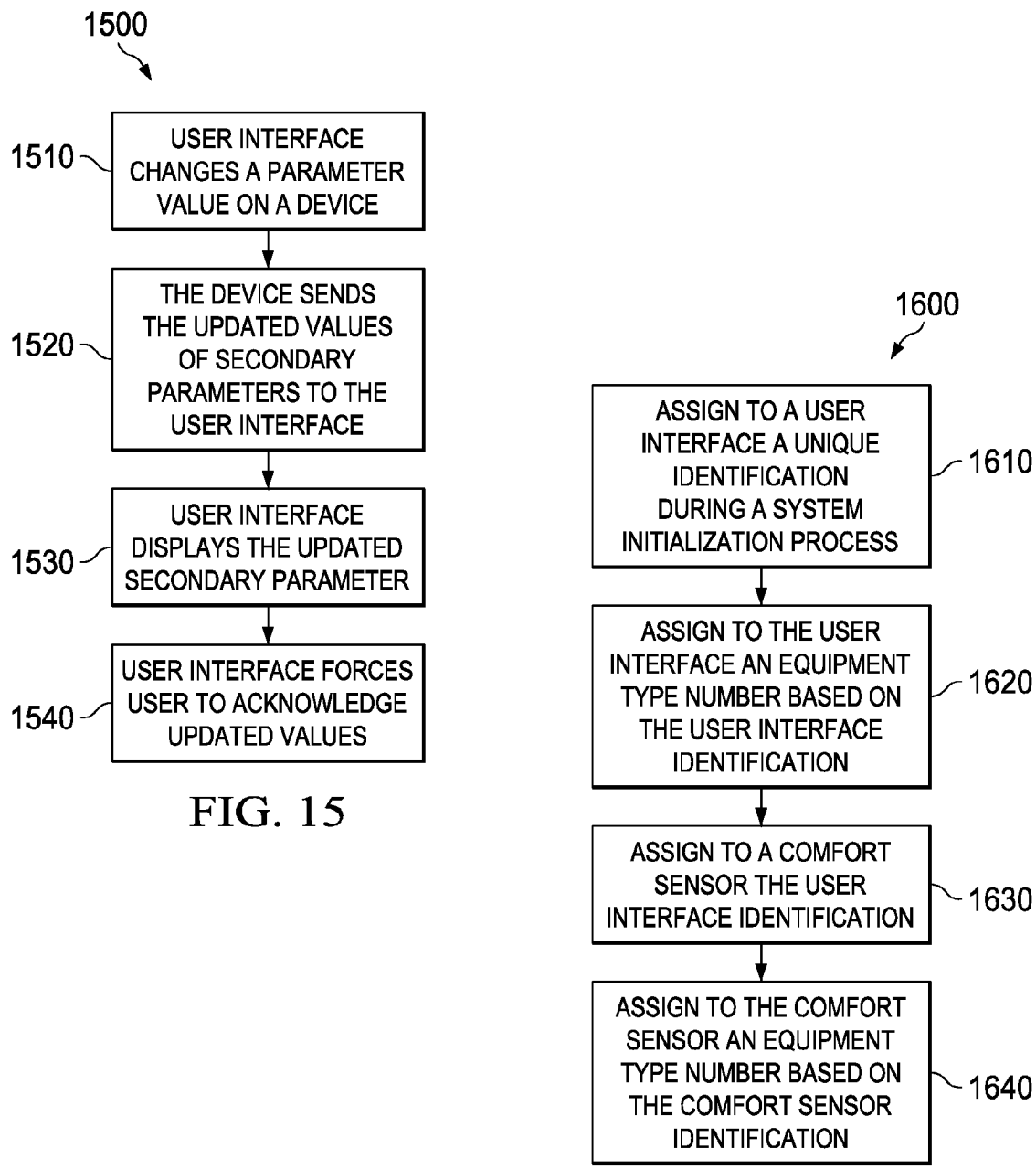

DEVICE ABSTRACTION SYSTEM AND METHOD FOR A DISTRIBUTED-ARCHITECTURE HEATING, VENTILATION AND AIR CONDITIONING SYSTEM

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008, entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Serial No. | Inventors | Title |
|---|---|---|
| [Attorney Docket No. 080161] | Grohman, et al. | "Alarm and Diagnostics System and Method for a Distributed-Architecture Heating, Ventilation and Air Conditioning Network" |
| [Attorney Docket No. 070064] | Wallaert, et al. | "Flush Wall Mount Control Unit and In-Set Mounting Plate for a Heating, Ventilation and Air Conditioning System" |
| [Attorney Docket No. 070027] | Thorson, et al. | "System and Method of Use for a User Interface Dashboard of a Heating, Ventilation and Air Conditioning Network" |
| [Attorney Docket No. 070016] | Grohman | "Device Abstraction System and Method for a Distributed-Architecture Heating, Ventilation and Air Conditioning Network" |
| [Attorney Docket No. 070079] | Grohman, et al. | "Communication Protocol System and Method for a Distributed-Architecture Heating, Ventilation and Air Conditioning Network" |
| [Attorney Docket No. 080151] | Hadzidedic, | "Memory Recovery Scheme and Data Structure in a Heating, Ventilation and Air Conditioning Network" |
| [Attorney Docket No. 080173] | Grohman, et al. | "System Recovery in a Heating, Ventilation and Air Conditioning Network" |
| [Attorney Docket No. 080131] | Grohman, et al. | "System and Method for Zoning a Distributed-Architecture Heating, Ventilation and Air Conditioning Network" |
| [Attorney Docket No. 080163] | Grohman, et al. | "Method of Controlling Equipment in a Heating, Ventilation and Air Conditioning Network" |
| [Attorney Docket No. 080160] | Grohman, et al. | "Programming and Configuration in a Heating, Ventilation and Air Conditioning Network" |
| [Attorney Docket No. 080146] | Mirza, et al. | "General Control Techniques in a Heating, Ventilation and Air Conditioning Network" |

TECHNICAL FIELD

This application is directed, in general, to HVAC systems and, more specifically, to a system controller and methods of use thereof.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler having a fan or blower), heat air (typically by means of a furnace) or cool air (typically by means of a compressor-driven refrigerant loop). A thermostat is typically included in a conventional climate control system to provide some level of automatic temperature and humidity control. In its simplest form, a thermostat turns the climate control system on or off as a function of a detected temperature. In a more complex form, the thermostat may take other factors, such as humidity or time, into consideration. Still, however, the operation of a thermostat remains turning the climate control system on or off in an attempt to maintain the temperature of the premises as close as possible to a desired set point temperature. Climate control systems as described above have been in wide use since the middle of the twentieth century and have, to date, generally provided adequate temperature management.

SUMMARY

One aspect provides a HVAC data processing and communication network. In an embodiment, the network includes a system device and a subnet controller. The system device is coupled to a data bus and configured to locally store feature or parameter data related to an operation of the system device. The subnet controller is configured to publish a message via the data bus directing the device to publish a message including the feature or parameter data to the network Another aspect provides a method of manufacturing an HVAC data processing and communication network. In an embodiment, the network includes a system device and a subnet controller coupled to a data bus. The system device is configured to locally store feature or parameter data related to an operation of the system device. The subnet controller is configured to publish a first message via the data bus directing the device to publish a second message including the feature or parameter data to the network.

Yet another aspect provides a system for storing information about attached system devices in an HVAC data processing and communication network. In an embodiment, the system includes at least one system device and a user interface coupled to the at least one device. The at least one system device includes information about device parameters that can be collected at the user interface.

BRIEF DESCRIPTION

Reference is now made to the following descriptions taken in conjunction with the accompanying drawings, in which:

FIG. 7 illustrates a method of manufacturing an HVAC data processing and communication network;

FIG. 9 illustrates a method of manufacturing an HVAC data processing a communication network to display messages in one or more of a plurality of languages;

FIG. 15 is a method of displaying parameter dependencies; and

FIG. 16 is a method of manufacturing the HVAC system.

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose, may require fewer, simpler repairs and may have a longer service life.

Figure 1:
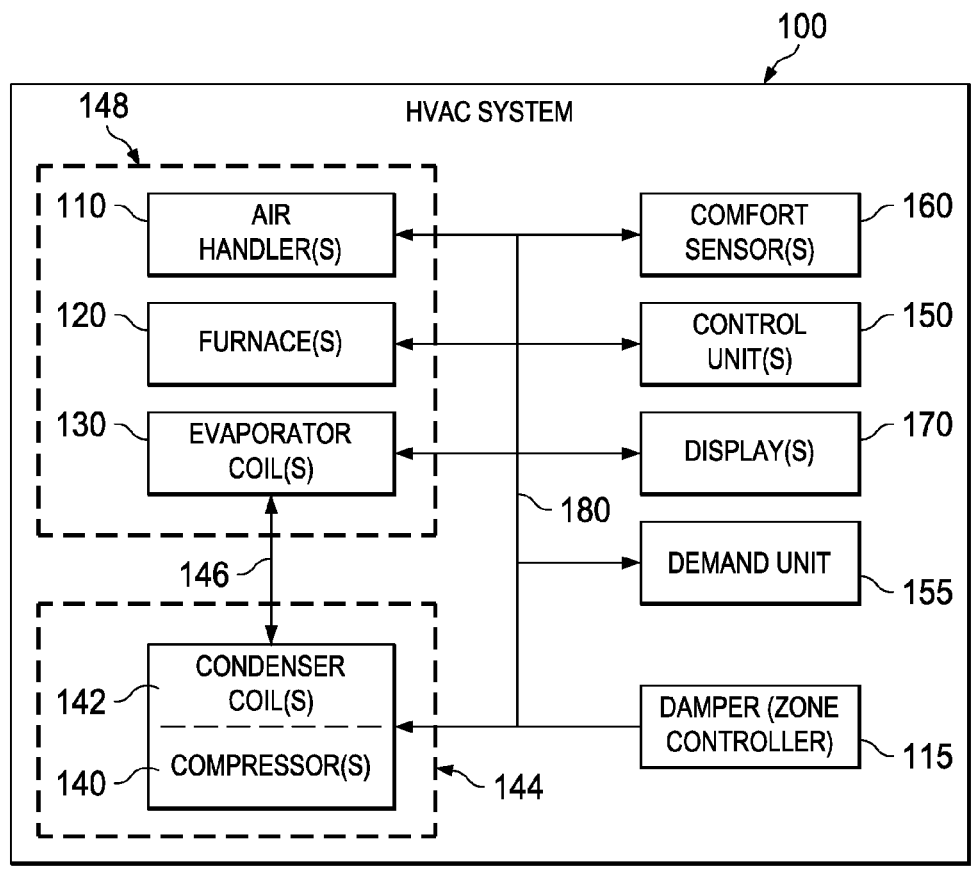
FIG. 1 is a high-level block diagram of an HVAC system according to various embodiments of the disclosure.

FIG. 1 is a high-level block diagram of a networked HVAC system, generally designated 100. The HVAC system 100 may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated with one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units that may also include an air handler.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, humidification, dehumidification, or air circulation. A demand unit 155 may provide more than one service, and if so, one service may be a primary service, and another service may be an ancillary service. For example, for a heating unit that also circulates air, the primary service may be heating, and the ancillary service may be air circulation (e.g. by a blower).

The demand unit 155 may have a maximum service capacity associated therewith. For example, the furnace 120 may have a maximum heat output (often expressed in terms of British Thermal Units (BTU) or Joules), or a blower may have a maximum airflow capacity (often expressed in terms of cubic feet per minute (CFM) or cubic meters per minute (CMM)). In some cases, the demand unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150, in a manner analogous with a conventional HVAC thermostat. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170, again analogously with a conventional HVAC thermostat. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal or OLED display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages. All or some parts of the data bus 180 may be implemented as a wired or wireless network.

The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. Other embodiments of the data bus 180 are also contemplated, including e.g., a wireless bus, as mentioned previously, and 2-, 3- or 4-wire networks, including IEEE-1394 (Firewire™, i.LINK™, Lynx™), Ethernet, Universal Serial Bus (e.g., USB 1.x, 2.x, 3.x), or similar standards. In wireless embodiments, the data bus 180 may be implemented, e.g., using Bluetooth™, Zibgee or a similar wireless standard.

Figure 2:
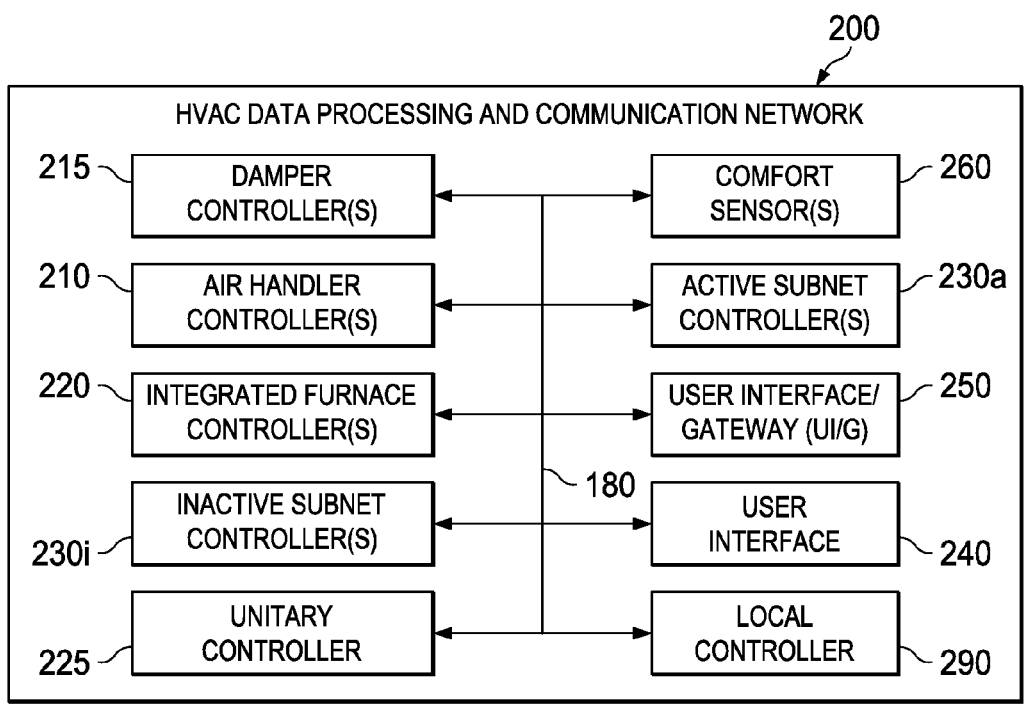
FIG. 2 is a high-level block diagram of one embodiment of an HVAC data processing and communication network.

FIG. 2 is a high-level block diagram of one embodiment of an HVAC data processing and communication network 200 that may be employed in the HVAC system 100 of FIG. 1. One or more air handler controllers (AHCs) 210 may be associated with the one or more air handlers 110 of FIG. 1. One or more integrated furnace controllers (IFCs) 220 may be associated with the one or more furnaces 120. One or more damper controller modules 215, also referred to herein as a zone controller module 215, may be associated with the one or more dampers 115. One or more unitary controllers 225 may be associated with one or more evaporator coils 130 and one or more condenser coils 142 and compressors 140 of FIG. 1. The network 200 includes an active subnet controller (aSC) 230a and an inactive subnet controller (iSC) 230i. The aSC 230a may act as a network controller of the system 100. The aSC 230a is responsible for configuring and monitoring the system 100 and for implementation of heating, cooling, humidification, dehumidification, air quality, ventilation or any other functional algorithms therein. Two or more aSCs 230a may also be employed to divide the network 200 into subnetworks, or subnets, simplifying network configuration, communication and control. Each subnet typically contains one indoor unit, one outdoor unit, a number of different accessories including humidifier, dehumidifier, electronic air cleaner, filter, etc., and a number of comfort sensors, subnet controllers and user interfaces. The iSC 230i is a subnet controller that does not actively control the network 200. In some embodiments, the iSC 230i listens to all messages broadcast over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260, referred to herein interchangeably as a comfort sensor (CS) 260, may provide an interface between the data bus 180 and each of the one or more comfort sensors 160. The comfort sensor 260 may provide the aSC 230a with current information about environmental conditions inside of the conditioned space, such as temperature, humidity and air quality.

For ease of description, any of the networked components of the HVAC system 100, e.g., the air handler 110, the damper 115, the furnace 120, the outdoor unit 144, the control unit 150, the comfort sensor 160, the display 170, may be described in the following discussion as having a local controller 290. The local controller 290 may be configured to provide a physical interface to the data bus 180 and to provide various functionality related to network communication. The SC 230 may be regarded as a special case of the local controller 290, in which the SC 230 has additional functionality enabling it to control operation of the various networked components, to manage aspects of communication among the networked components, or to arbitrate conflicting requests for network services among these components. While the local controller 290 is illustrated as a stand-alone networked entity in FIG. 2, it is typically physically associated with one of the networked components illustrated in FIG. 1.

Figure 3:
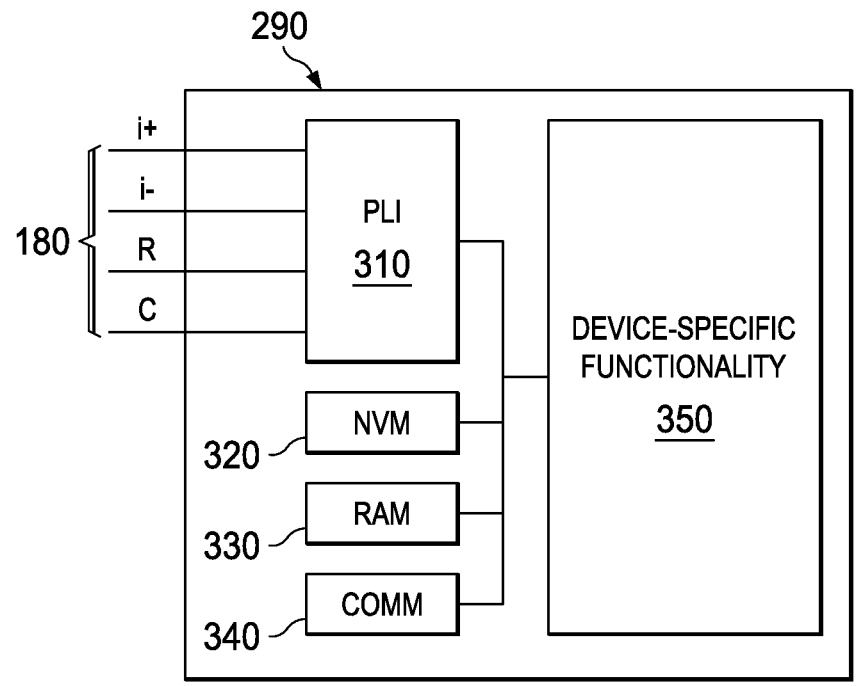
FIG. 3 is a block diagram of a local controller of the disclosure.

FIG. 3 illustrates a high-level block diagram of the local controller 290. The local controller 290 includes a physical layer interface (PLI) 310, a non-volatile memory (NVM) 320, a RAM 330, a communication module 340 and a functional block 350 that may be specific to the demand unit 155, e.g., with which the local controller 290 is associated. The PLI 310 provides an interface between a data network, e.g., the data bus 180, and the remaining components of the local controller 290. The communication module 340 is configured to broadcast and receive messages over the data network via the PLI 310. The functional block 350 may include one or more of various components, including without limitation a microprocessor, a state machine, volatile and nonvolatile memory, a power transistor, a monochrome or color display, a touch panel, a button, a keypad and a backup battery. The local controller 290 may be associated with a demand unit 155, and may provide control thereof via the functional block 350, e.g. The NVM 320 provides local persistent storage of certain data, such as various configuration parameters, as described further below. The RAM 330 may provide local storage of values that do not need to be retained when the local controller 290 is disconnected from power, such as results from calculations performed by control algorithms. Use of the RAM 330 advantageously reduces use of the NVM cells that may degrade with write cycles.

In some embodiments, the data bus 180 is implemented over a 4-wire cable, in which the individual conductors are assigned as follows:

R—the "hot"—a voltage source, 24 VAC, e.g.
C—the "common"—a return to the voltage source.
i+—RSBus High connection.
i-—RSBus Low connection.

The disclosure recognizes that various innovative system management solutions are needed to implement a flexible, distributed-architecture HVAC system, such as the system 100. More specifically, cooperative operation of devices in the system 100, such as the air handler 110, outdoor unit 144, or UI 240 is improved by various embodiments presented herein. More specifically still, embodiments are presented of treating HVAC components abstractly in a manner that decouples the HVAC physical layer from the HVAC logical or network layer. In many cases, more sophisticated control of the HVAC system is possible than in conventional systems, allowing expanded feature availability to the user and more efficient operation of the system.

Figure 4:
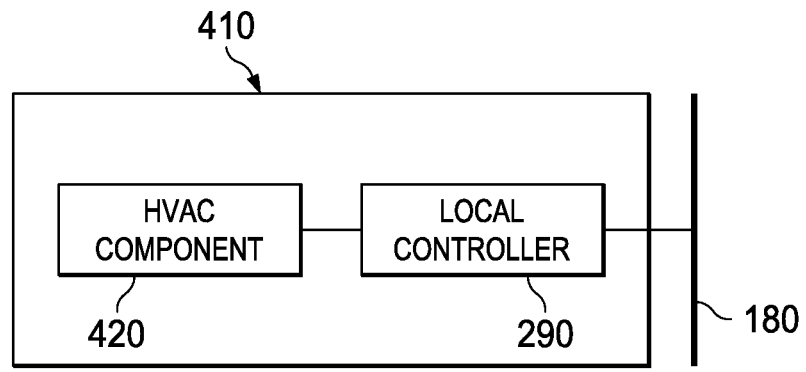
FIG. 4 is a block diagram of a networked HVAC system device of the disclosure.

FIG. 4 illustrates a system device 410 according to the disclosure. The system device 410 may be referred to briefly herein as a "device 410" without any loss of generality. The following description pertains to the HVAC data processing and communication network 200 that is made up of a number of system devices 410 operating cooperatively to provide HVAC functions. Herein after the system device 410 is referred to more briefly as the device 410 without any loss of generality. The term "device" applies to any component of the system 100 that is configured to communicate with other components of the system 100 over a wired or wireless network. Thus, the device 410 may be, e.g., the air handler 110 in combination with its AHC 210, or the furnace 120 in combination with its IFC 220. This discussion may refer to a generic device 410 or to a device 410 with a specific recited function as appropriate. An appropriate signaling protocol may be used to govern communication of one device with another device. While the function of various devices 410 in the network 200 may differ, each device 410 shares a common architecture for interfacing with other devices, e.g. the local controller 290 appropriately configured for the HVAC component 420 with which the local controller 290 is associated. The microprocessor or state machine in the functional block 350 may operate to perform any task for which the device 410 is responsible, including, without limitation, sending and responding to messages via the data bus 180, controlling a motor or actuator, or performing calculations.

In various embodiments, signaling between devices 410 relies on messages. Messages are data strings that convey information from one device 410 to another device 410. The purpose of various substrings or bits in the messages may vary depending on the context of the message. Generally, specifics regarding message protocols are beyond the scope of the present description. However, aspects of messages and messaging are described when needed to provide context for the various embodiments described herein.

Figure 5:
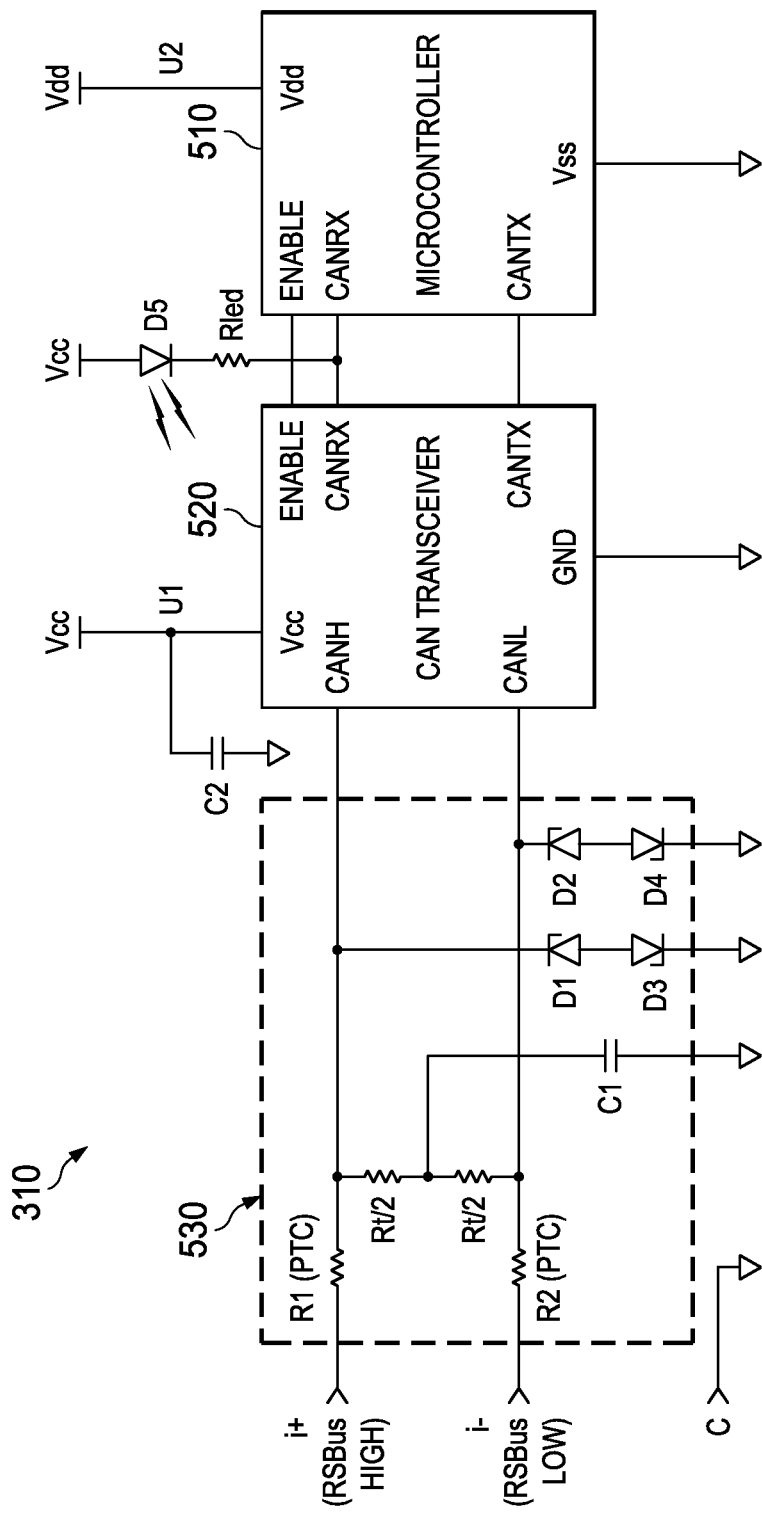
FIG. 5 is a schematic diagram of a representative physical layer interface.

FIG. 5 illustrates one embodiment of the PLI 310. The PLI 310 includes a CAN-enabled microcontroller 510, a CAN transceiver 520, and a termination and protection circuit 530. The transceiver 520 constantly monitors the RSbus 180, including during the transmission of its own messages. In many cases, this ability of the transceiver 520 to monitor itself is advantageous to determining a corrective action taken by the device 410 when arbitration is lost during a message arbitration phase of bus communication, or when an error condition occurs.

In some embodiments, up to four subnets may be connected to a single RSBus 180. Typically one aSC 230a is connected to the RSBus 180 for each subnet. For embodiments in which multiple subnet controllers 230 are present in a single subnet, one of the subnet controllers is typically designated as the aSC 230a and controls the subnet. Thus, in such embodiments there may be up to four active subnet controllers on the RSbus 180. The total number of devices 410 is typically limited by design choices to a maximum value. In some embodiments, the number of devices 410 connected to the RSbus 180 at any given time is limited to 32. Those skilled in the art will appreciate that the limit may be greater or fewer than 32. Moreover, while an integer power of 2 may be chosen for convenience, the number of devices 410 is not limited to numbers in this set.

The PLI 310 includes resistors $R_1$ and $R_2$. In an example embodiment, $R_1$ and $R_2$ are 60V-rated Positive Temperature Coefficient resistors and work as resettable fuses. Illustrative resistors include RXE010 by Raychem (Tyco), MF-R010 by Bourns, or 3610100600 by Wickmann, or equivalent. A resistor $R_t$ may be a 1% metal film resistor. $R_t$ provides a complement termination resistance to the differential input i+/i−. $R_1$, $R_t$ and $R_2$ form a series resistance $R_{term}$ at the differential input that provides a termination resistance to i+/i−. The value of $R_{term}$ may be different for different devices 410. A capacitor $C_1$ provides EMI decoupling of the differential input.

Diodes $D_1$, $D_2$, $D_3$ and $D_4$ provide transient voltage suppression. In an example, $D_2$ $D_2$, $D_3$ and $D_4$ rated at 10V, 600 W. $D_5$ is an optional LED that provides visual feedback that the device 410 is capable of receiving a bus message. $D_5$ may be advantageously located adjacent a connector that receives i+/i− on each device 410. In some embodiments, $R_1$, $R_2$, $D_1$, $D_2$, $D_3$, and $D_4$ are not used when an appropriately configured transceiver 520 is used.

It should be noted that a CAN transceiver, e.g., the transceiver 520, can draw significantly more current from $V_{cc}$ when it is transmitting a dominant bit than when it is idle. Good design practice takes the peak load of the transceiver 520 into account when providing power thereto. In some embodiments, $V_{cc}$ is 5V or greater to allow for the recessive state of the RSbus 180 to be 2.5V.

The RSBus 180 provides the ability to connect multiple HVAC systems, e.g., multiple instances of the system 100, together on one bus. When done, it is preferred that the connection between the systems 100 is made at a central interior location such as the furnace 120. It is also preferred in these embodiments to only connect i+/i− from each system 100, while leaving the R and C wires unconnected. This approach recognizes that each system 100 typically provides at least one separate transformer to power the R and C lines associated with that system 100. The transformer is typically located with an indoor unit such as the furnace 120 and also earth grounded there so it will often be convenient and most robust to connect the several data busses 180 at the location of the furnaces 120 associated with the several systems 100.

Each device 410 may be configured to transmit data on the RSbus 180 at one or more data rates. In some embodiments, the devices 410 may be configured to use a selected one of a plurality of data rates that the device 410 is capable of supporting. For example, the device 410 may be configurable to communicate at about 10 k baud, 20 k baud, 33.3 k baud, 40 k baud, 50 k baud, 62.5 k baud, 83.3 k baud, 100 k baud and 125 k baud. In some embodiments, the network transmission speed is configured to be about 40 k baud as a balance between transmission speed and reliability.

Communication between the devices 410 is generally governed by a communication protocol. An example of a suitable protocol is provided by the Bosch CAN network as defined by the Bosch CAN2.0B standard. While it is recognized that any suitable communications standard is contemplated by the disclosure, this description refers without limitation to various example embodiments using the Bosch CAN standard.

The network allows for Peer-to-Peer (PTP) communication. Each device 410 may communicate with another device 410 via a message. The Bosch standard provides, for example, a 29-bit message identifier which allows for up to $2^{29}$ (536, 870, 912) unique messages to be defined and used. Thus a master bus controller is typically unnecessary. However, in various embodiments the SC 230 controls HVAC functionality, stores configurations, and assigns addresses during system auto configuration, e.g.

In various embodiments, it may be convenient or may significantly simplify system design to use various levels of abstraction with respect to components and data structures used in the system 100. Such abstraction may simplify design and specification of the system 100, and may provide a basis for communication between designers and between a system manufacturer and installers or users of the system 100.

In an advantageous embodiment, the network 200 is configured so that each device on the RSBus 180 is a logical device. A logical device is a device that may be independently addressed for communication purposes within the network 200. A particular logical device may or may not be physically co-located with another logical device. Thus in some cases a device, for example without limitation the comfort sensor 260, may be embodied in a standalone physical device. In other cases the device may be a "virtual" device, meaning the device is an integral part of a combination with another logical device while remaining independently addressable. In one aspect, independently addressable devices are regarded as being coupled independently to the data bus 180. As a non-limiting example, a comfort sensor 260 may be integrated with a subnet controller 230. Each of the comfort sensor 260 and the subnet controller 230 are separate logical devices, though the combination may appear as a single physical entity.

In one embodiment of the disclosure, the system 100 includes a logical subnet controller (LSC). In general, the subnet controller 230 is a logical part of a physical device 410 on the network 200. Functions of the SC may include configuration of the system 100 and implementation of an HVAC control algorithm. The SC 230 may store system configuration information. In various embodiments, the SC 230 is physically located in an enclosure that also includes one or both of a comfort sensor 260 and a UI 240. However, the SC 203 may be placed with any other device 410 in the network 200. If the network 200 includes more than one SC 230, a negotiation algorithm may determine which controller acts as the active subnet controller 230a. Those SC 230 that are not active may operate in a listen-only mode. The LSC is a virtual device that may be defined for any device 410. In some embodiments, it is preferred that the LSC is co-located with the UI 240.

Figure 6A:
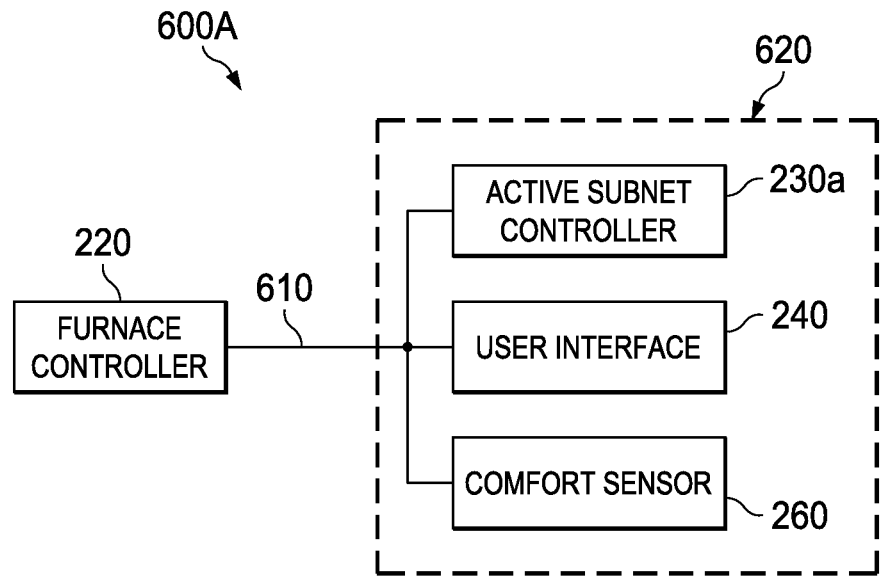
FIGS. 6A and 6B illustrate example configurations of a networked HVAC system.

FIG. 6A illustrates an example of an HVAC system subnet 600A. The subnet 600A includes four devices configured to communicate over a communication bus 610. In various embodiments the communication bus 610 is an RSBus. The subnet 600A includes an indoor unit illustrated without limitation as an instance of the IFC 220, an instance of the aSC 230a, an instance of the UI 240, and an instance of the comfort sensor 260. These networked devices form a subnet. The UI 240 allows an operator to interact with the networked devices, set temperature set points, etc. The comfort sensor 260 provides temperature information to other devices on the subnet 600A. The comfort sensor 260 may include, e.g., a transducer that converts a temperature or RH to an electrical signal for further processing. The active subnet controller 230a provides overall control to the subnet 600A.

The subnet 600A illustrates a typical minimum set of functional elements of a networked HVAC system of the disclosure, e.g., a controlling device, a controlled device, a feedback device and an operator interface. For example, in a temperate climate, a residential HVAC system may have a means to heat the residence, but may not require cooling. Thus, the furnace 120 may be sufficient to maintain year-round comfort in the residence. Other minimum HVAC systems are possible, as will be apparent to one skilled in the pertinent art. For example, the IFC 220 could be replaced by heat pump controller, or the UI 240 could be replaced by the UI/G 250 to provide remote programmability.

Figure 6B:
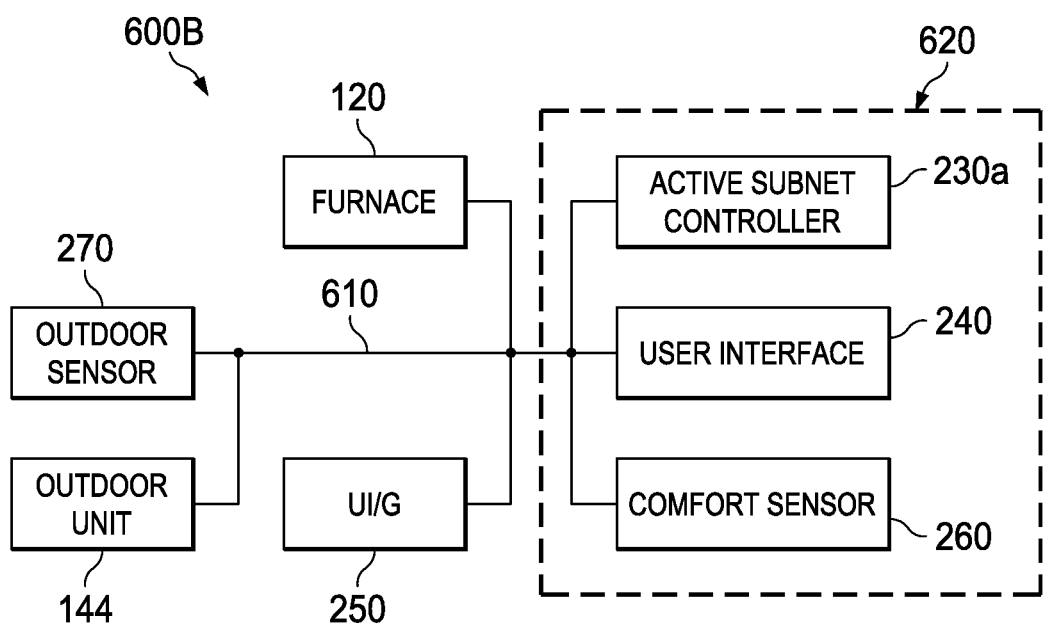

FIG. 6B illustrates an embodiment of a more general case of a subnet, here designated 600B. In addition to the components of the subnet 600A, the subnet 600B includes an outdoor unit 144 and associated controller. The outdoor unit 144 may be, e.g., a heat pump or an air conditional compressor/condenser unit. An instance of the outdoor sensor 270 may be installed to provide outdoor temperature or humidity data to the aSC 230a for use in a control algorithm, e.g. An instance of the UI/G 250 may provide an interface between the subnet 600B and an external communication network, e.g. the internet. Such connectivity provides a means for control, configuration or data collection to an external entity such as an installer or manufacturer.

FIG. 7 illustrates a method of the disclosure, generally denoted 700, of manufacturing an HVAC data processing and communication network, such as the network 200. The method 700 is described without limitation with reference to components of the network 200. The method 700 begins with a step 710 that may be entered from any appropriate state of the system 100. In a step 720, a controller, e.g., the SC 230, is configured to control the device 410 via the data bus 180. In a step 725, the SC 230 is configured to be addressed over the data bus 180. In a step 730, an environmental sensor, e.g. the comfort sensor 260, is configured to provide environmental data to the SC 230 via the data bus 180. In an optional step 740, the comfort sensor 260 is further configured to be addressed via the data bus 180 independently of the SC 230. For example, the SC 230 and the comfort sensor 260 may have different equipment type numbers that are used to direct messages over the data bus 180. In a step 750, a user interface, e.g., the UI 240 or the UI/G 250, is configured to provide access by an operator to the network 200. For example, the UI 240 may allow manual parameter entry via a screen, and the UI/G may allow parameter entry via a desktop computer configured with appropriate software. In a step 760, the user interface is configured to be addressed via the data bus 180 independently of the SC 230 and the comfort sensor 260. Again, the user interface may be configured to have an equipment type number. The method 700 ends with a step 770.

Each of active subnet controller 230a, user interface 240 and comfort sensor 260 can be embodied in an individual autonomous unit that may be coupled with the communication bus 610 anywhere within the structure, e.g., residence, in which the subnet 600A is installed. Thus, the subnet controller 230a, the user interface 240 and the comfort sensor 260 are not necessarily located together or even within the same indoor space. Alternatively, any two or more of subnet controller 230a, user interface 240 and comfort sensor 260 may be combined in a single physical control unit 620 and the remaining, if any, of the aSC 230a, user interface 240 and comfort sensor 260 may be an individual autonomous unit. In this alternate embodiment, the combined unit (i.e., any two or more of the aSC 230a, user interface 240 and comfort sensor 260) and the remaining, if any, of the aSC 230a, user interface 240 and comfort sensor 260 may be coupled with the communication bus 610 anywhere within the subnet 600A. Whether or not any two or more of the aSC 230a, user interface 240 and comfort sensor 260 are combined in a single physical unit, the aSC 230a, user interface 240 and comfort sensor 260 are logically separate devices as far as communication on the communication bus 610 is concerned. Similarly, the user interface 240 and comfort sensor 260 are logically separate devices as far as communication on the bus 610 is concerned. They may be housed together in the control unit 620, as shown in FIG. 6A, or may be housed in separate physical units.

As described previously, the aSC 230a may control HVAC functionality, store configurations, and assign addresses during system auto configuration. The user interface 240 provides a communication interface to provide information to and receive commands from an operator. The comfort sensor 260 may measure one or more environmental attributes that affect user comfort, e.g., ambient temperature, relative humidity (RH) and pressure. The three logical devices 230a, 240, 260 each send and receive messages over the communication bus 610 to other devices attached thereto, and have their own addresses on the subnet 600A. In many cases, this design feature facilitates future system expansion and allows for seamless addition of multiple sensors or user interfaces on the same subnet. For example, an upgraded subnet controller may be provided with a replacement indoor unit. The upgraded subnet controller may automatically take over operation of the subnet without removal of a previously existing subnet controller. The aSC 230a may be upgraded, e.g., via a firmware revision. The aSC 230a may also be configured to release control of the subnet 600A and effectively switch off should another subnet controller present on the subnet 600A request it.

In another more generalized example, a system device 410 is preloaded with feature or parameter data associated with another system device 410. For instance, a replacement system device 410 may include feature or parameter data associated with a demand unit 155, e.g. the furnace 120. The replacement device 410 in some cases may be an SC 230 included with a replacement demand unit 155. In various embodiments the replacement system device 410 replaces a similar system device 410. For example, a similar device 410 may be a UI 240 replacing a UI 240, an SC 230 replacing an SC 230, etc.

In some cases, the replacement system device 410 may replace a UI 240. The replacement UI 240 may include feature or parameter data associated with the demand unit 155. The feature or parameter data may include, e.g., parameter values, definitions and strings associated with operation of the demand unit 155. The feature or parameter data held by the replacement UI 240 may provide updates to functionality provided by the demand unit 155, e.g.

The aSC 230a may be configured to publish a first message to the demand unit 155 instructing the demand unit 155 to publish at least some of the feature or parameter data stored thereby when the replacement UI 240 is installed in the system 100. In various embodiments, the first message is published during a commissioning process of the system 100. In some cases, the aSC 230a is configured to instruct the demand unit 155 to publish only those feature or parameter data not preloaded on the replacement UI 240. The aSC 230a may publish one or more messages instructing the replacement UI 240 to publish the preloaded data so the demand unit 155 can determine those features or parameter data not included in the preloaded data set.

Configuring the control unit 620 as logical, independently addressable blocks advantageously provides flexibility in the configuration of the subnet 600A. System control functions provided by the aSC 230a may be placed in any desired physical device, in this example the control unit 620. Alternatively, e.g., the aSC controller 230a could be placed within a physical enclosure of the furnace 120, while maintaining independent addressability. The location of these control functions within any particular physical enclosure need not affect other aspects of the subnet 600A. This abstraction provides for seamless upgrades to the subnet 600A and ensures a high degree of backward compatibility of the devices present in the network. The approach provides for centralized control of the system, without sacrificing flexibility or incurring large system upgrade costs.

For example, the use of the logical aSC 230a provides a flexible means of including multiple control units 150 on a same network in a same conditioned space. The HVAC system, e.g., the system 100, may be easily expanded. The system retains backward compatibility, meaning the subnet 600A may be updated with a completely new type of equipment without the need to reconfigure the system. Moreover, the functions provided by the subnet controller may be logically placed in any physical device, not just the control unit 620. In some cases, where an upgrade requires subnet controller functionality not provided by a subnet controller already present in the system 100, a new subnet controller may be installed in the system 100 without the need to remove a previously installed subnet controller. In some cases, the new subnet controller may be installed, if desired, in new or replacement equipment. Thus, for example, a replacement furnace having functionality not supported by an installed subnet controller may have an upgraded subnet controller having the necessary functionality installed within the furnace enclosure. When the furnace is installed in the HVAC system 100, the subnet controller within the furnace may take control of the subnet on which the new furnace is installed, thereby providing the overall system functionality required by the new furnace. The physical separability of the active subnet controller 230a, the user interface 240, and the comfort sensor 260 also provides the manufacturer of the subnet 600A greater flexibility in selecting these devices, from various suppliers.

Figure 8:
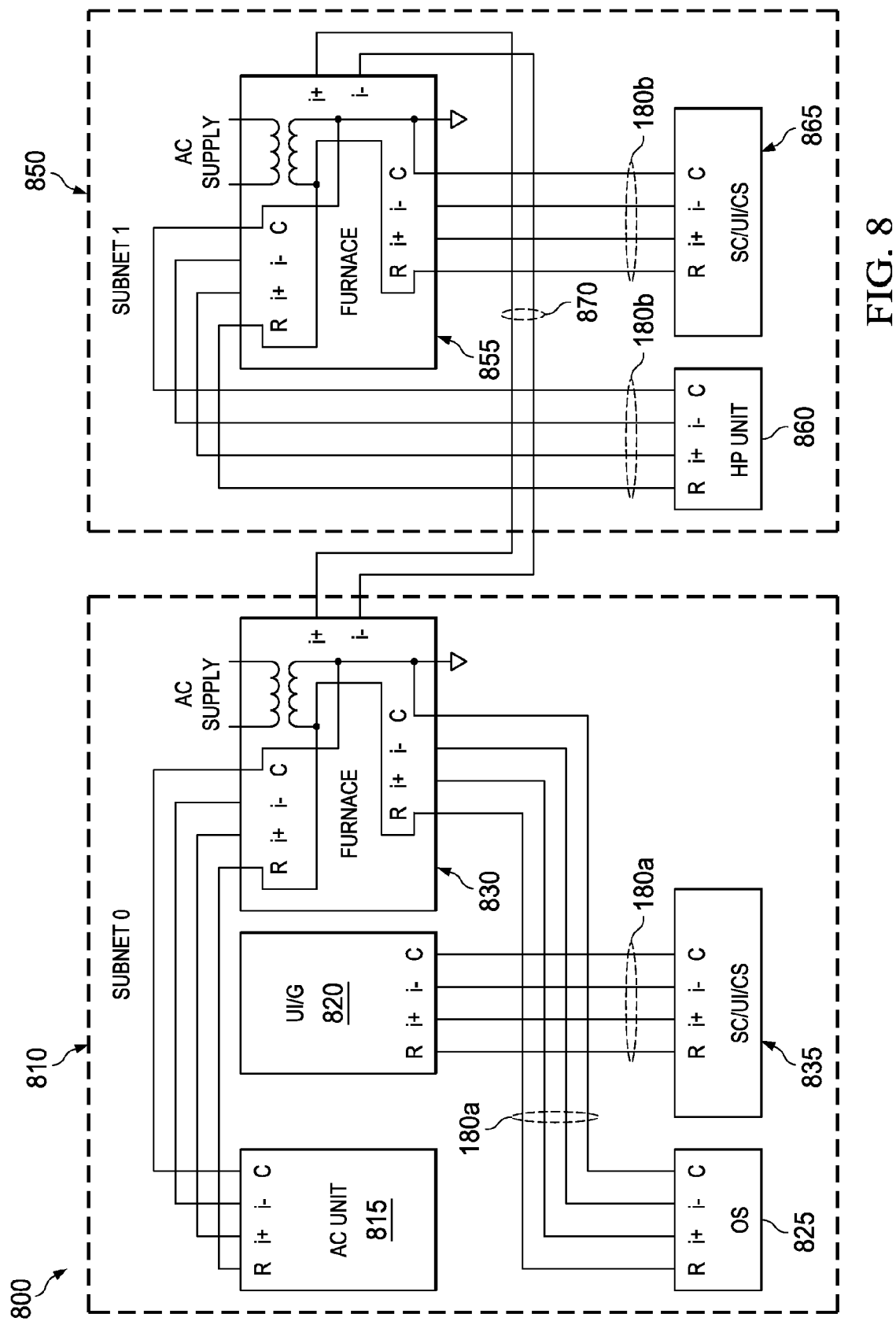
FIG. 8 illustrates bus connections between two subnets.

FIG. 8 illustrates a detailed connection diagram of components of a network 800 according to one embodiment of the disclosure. The network 800 includes a subnet 810 and a subnet 850. The subnet 810 includes an air conditioning (AC) unit 815, a UI/G 820, an outside sensor (OS) 825, a furnace 830, and a control unit 835. The control unit 835 may house an aSC 230a, a user interface 240 and a comfort sensor 260, each of which is independently addressable via a data bus 180a. The subnet 850 includes a furnace 855, a heat pump 860 and a control unit 865. The control unit 865 houses an aSC 230a, a user interface 240 and a comfort sensor 260, each of which is independently addressable via a data bus 180b. In various embodiments and in the illustrated embodiment each individual subnet, e.g., the subnets 810, 850, are each configured to be wired as a star network, with connections to all devices therein made at a furnace or air handler associated with that subnet. Thus, e.g., each of the devices 815, 820, 825, 835 is connected to the data bus 180a at the furnace 830. Similarly, each device 860, 865 is connected to the subnet 850 at the furnace 855. Each furnace 830, 855, generally representative of the indoor unit 148, may include a connection block configured to accept a connection to the RSBus 180. For example, two terminals of the connection block may be 4-pin connectors. In one embodiment, one 4-pin connector is dedicated to connecting to an outdoor unit, for example the connection from the furnace 830 to the AC unit 815. Another 4-pin connector is used to connect to equipment other than the outdoor unit, e.g., from the furnace 830 to the UI/G 820, the OS 825, and the control unit 835. A third connector may be a 2-pin connector configured to connect one subnet to another subnet. In the network 800, e.g., the subnet 810 is connected to the subnet 850 via a wire pair 870 that carries the i+/i− signals of the serial bus. As described previously with respect to the furnace 120, a transformer located at the furnace 830 may provide power to the various components of the subnet 810, and a transformer located at the furnace 855 may provide power to the various components of the subnet 850 via R and C lines. As illustrated, the C line may be locally grounded.

The description now turns to aspects of configuration of devices on the RSBus 180 (FIG. 2). Each system device 410 is configured to include various data useful in configuration and management of the system 100. The data may be stored, e.g., in nonvolatile memory located on the system device 410, e.g., the NVM 320. Stored parameters may include one or more of those listed in Table I below, wherein some parameters are shown with a brief description of the purpose thereof. Each system device 410 is preferably configured with these parameters by a manufacturer/supplier of the system device 410 prior to delivery to a system integrator/installer.

TABLE 1

| Parameter | Detail |
| --- | --- |
| Control Serial Number | |
| Control Part Number | |
| Software Revision Number | |
| Hardware Revision Number | |
| Device Designator | A unique number, containing control's MAC layer address. |
| Protocol Revision Number | The revision of the RSBus specification that the device conforms to. |
| The name of all device alarms in ASCII text format in all languages supported. | |
| The text for all User Messages used in ASCII and/or Unicode text format in all languages supported. | |
| Equipment Type name encoded in ASCII and/or Unicode text format in all languages supported. | |
| The name of all supported features and parameters in ASCII and/or Unicode text format in all languages supported. | |

The system device 410 may optionally be configured to include the parameters shown in Table 2 either by the manufacturer/supplier or by the integrator/installer.

TABLE 2

| Parameter | Detail |
| --- | --- |
| Device Product Level | Designation of the device's position in the integrator's product line. |
| Equipment Part Number | A part number of HVAC equipment in which the device is installed. |
| Equipment Serial Number | A serial number of HVAC equipment in which the device is installed. |
| Unit Capacity | A thermal capacity of the HVAC equipment in which the control is installed. |

In various embodiments, one or more of the following design features may be employed in the system device 410. Implementation of these features is within the ability of those skilled in the pertinent art. As described earlier, the system device 410 includes the NVM 320. Such memory may be used for various purposes, such as alarms or parameter storage. The device may be configured by the manufacturer to default to subnet 0, and have a subnet priority set to 0. The device 410 may be configured to write, read and erase the NVM 320. Of course this list of design features is not exclusive of other design features within the scope of the disclosure.

Each device 410 may be configured to store various data in its NVM 320, including without limitation: parameter values pertaining to that particular device 410; relevant parameters pertaining to features or parameters of other devices 410 on the subnet; a value uniquely identifying the device 410 on the subnet (subnet ID); and a value identifying the equipment type of the device 410.

The following data may also be stored by the NVM 320, though the need for persistent storage may be less than the aforementioned parameters:

Any relevant parameter values of other devices 410 in the subnet or other subnets Data associated with any feature/functions provided by the device 410

The aforementioned parameters are generally regarded as privileged or critical to the intended operation of the device 410. It is thus generally preferred that these parameters be clearly separated from other information that may be stored in the NVM 320, such as current alarms, diagnostic information, statistics, etc. The privileged/critical parameters may also be protected by a checksum and/or CRC so that the integrity of these data can be confirmed upon powering up the device 410. In some cases, the SC 230 has separate CRCs for each device data backup. This enables the SC 230 to recover specific devices independently if needed when acting as the aSC 230a.

Each device 410 typically has a receive buffer to accommodate transfer protocol data transfers. The buffer may be provided, e.g., by the RAM 330. It may be preferred that the buffer be at least 256 bytes deep. The needed depth may be significantly greater for a device that supports multi-channel transfer protocol.

In some cases, the device 410 may provide textual information to a user in the form of informational, alert and/or alarm strings. Such functionality may be provided, e.g., by the UI 240, but a display may be included on any device 410 as desired. The system 100 may be implemented to support any written language desired. Typically, the choice of language is driven by market factors. Thus, in the North American market, the system may be configured to support English, Spanish and/or French. One language, e.g. English, may be selected as a primary/default language, with the system 100 providing any number of optional secondary languages upon a user action to select the secondary language desired for a particular locus. Thus, each user interface 240 or UI/G 250 to the system can be configured in a different language, as desired by the local device operator. Multiple user interfaces 240 and UI/Gs 250 can co-exist, each using a different language. Thus, for example, one UI 240 located at a first location in a premises may display messages in English, while another UI 240 in the same or a different subnet and located at a second different location in the premises may display messages in Spanish.

Each device may include character string representations of its alarms, parameter, feature, user messages, etc. encoded in all supported languages and stored in the NVM 320. Additionally, the UI/G 250 may locally store names of supported alarms, parameter and feature sets in one or all supported languages. Local storage advantageously reduces the amount of traffic on the network and facilitates quicker interfacing with the user.

In an embodiment, a plurality of user messages are identified by unique numbers, referred to herein as text IDs. The user messages are stored as character strings. A text ID may be used as a pointer to a character string stored in memory. The actual text strings associated with the text IDs may be customized for a particular language configuration. A particular message may be regarded as being any character string that conveys a particular concept. For example, the concept "comfort sensor error" may be rendered in any number of written languages, but each rendering is the same message, because each conveys the concept rendered in English as "comfort sensor error."

The plurality of stored character strings may include a number of different messages, each being rendered in at least one, but typically two or more languages. The message strings can be stored on the UI 240 or in another device 410. When the UI 240 is to display a character string in a given language, it may issue a request that includes a text ID corresponding to that message to the device 410 on which the character string corresponding to that message is stored. A language ID value may also be sent to identify the desired language. The device 410 that receives the request may then provide the requested string, e.g., the desired message rendered in the desired language, over the RSBus 180. The character string may then be displayed by the UI 240. Optionally, the character string may be buffered by the UI 240, e.g., in the RAM 330, or may be stored locally by the UI 240 so retrieval from another device 410 is not necessary.

FIG. 9 illustrates a method generally designated 900 of manufacturing an HVAC data processing a communication network to display messages in one or more of a plurality of languages. The method 900 is described without limitation with reference to components of the network 200. The method 900 begins with a step 910 that may be entered from any appropriate state of the system 100. In a step 920, the device 410 is configured to store a plurality of character strings. The strings may include, e.g., status or error messages. In a step 930, the device 410 is further configured to associate a text ID with each of the character strings. In a step 940 the device is further configured to recall a predetermined character string in response to receiving a first message, via the network 200, that includes a predetermined text ID associated with the predetermined character string. In some embodiments, the first message also includes a language ID. In a step 950 the device is further configured to send, via the network, a second message including the predetermined character string. The second message may be received, e.g., by the UI 240 and displayed thereby. The method 900 ends with state 960 from which a calling routine may resume operation.

The system 100 may be configured to limit allowed configurations of devices 410. For example, it may be determined that certain configurations of the system 100 are undesirable or incompatible with proper operation of the various devices 410. In various embodiments, initialization of the system 100 includes a commissioning operation in a commissioning state in which the various devices 410 in the subnet are assigned credentials to operate on the subnet. The aSC 230a may be configured to ignore a request made during the commissioning state from a device 410 outside a permitted configuration set from registering with the SC 230 to prevent undesired or unpredictable operation that might otherwise result.

In some cases, the aSC 230a is configured to allow only one instance of a type of device 410 to operate on a subnet. For example, the following device 410 types are generally limited to a single instance in the system 100: a furnace, a coil blower (a.k.a. an air handler), a twinning kit, and a furnace equipment interface module. In some cases, e.g., this limitation results in exclusion of a system 100 configured with a furnace and a coil blower, or with two furnaces (without the twinning kit). The aSC 230a may be configured to register only one instance of these devices on the network subnet, optionally in the following order: twinning kit, furnace, coil blower, and furnace equipment interface module.

Generally, it is also desirable to limit the system 100 to include only one outdoor unit per subnet, e.g., the condenser coils/compressor 140, unless a twinning kit is used. Thus, e.g., a system 100 operating with a single subnet may be configured to exclude a configuration that includes a separate air conditioner and a heat pump/air conditioner. The aSC 230a may be configured to register only one of these devices on the subnet, and to optionally do so in the following order: heat pump/air conditioner, stand-alone air conditioner, and dual-fuel interface module.

As described earlier, the number of physical devices may be limited to a desired number, e.g., 32. However, such limitations may not be necessary with respect to logical devices. In some embodiments, there is no limit on number of logical devices in each physical device, other than a limit imposed by address space in a message string.

HVAC functions performed by the devices 410 may be classified into groups called services. A service is a distinct function performed by the system 100 with a goal to provide certain functionality to the user. In most cases, this functionality includes maintaining a temperature, and optionally an RH, in the conditioned space.

Figure 10:
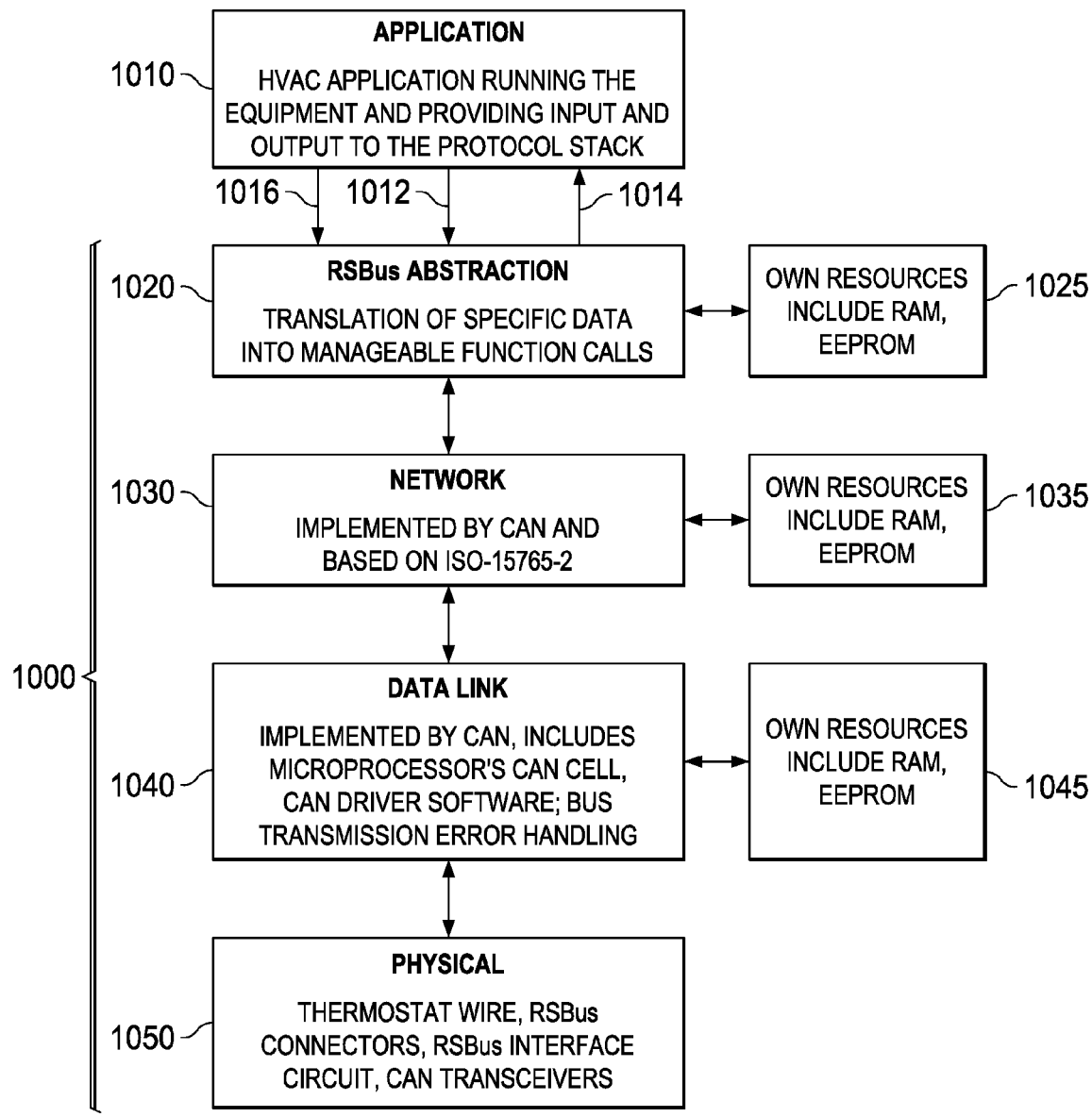
FIG. 10 illustrates an example protocol stack.

The devices 410 may be configured to implement a protocol referred to herein and in the claims as an RSBus Protocol Stack. FIG. 10 illustrates an example protocol stack, generally designated 1000. It may be preferable from the viewpoint of a system integrator that component suppliers comply with the architecture embodied by the RSBus Protocol Stack to improve quality of system testing and product reliability.

An application 1010 interacts with the protocol stack 1000. The application 1010 may be an HVAC application, e.g., a set of control routines, running the aSC 230a to operate the system 100 to maintain a temperature of a living area. The interface between the application 1010 and the stack 1000 may be implemented using three function calls, e.g., as follows:

a send function 1012 initiated by the application 1010 to allow sending data on the data bus 180, or requesting data from the data bus 180, a callback function 1014 initiated by the stack 1000 to inform the application 1010 of a relevant event, and a control/status function 1016 initiated by the application 1010 to check or change the state of the stack 1000.

The stack 1000 consists of four layers. A first layer 1020 is an RSBus abstraction layer. In the layer 1020 specific data are translated into manageable function calls. The layer 1020 may be associated with dedicated resources 1025, including RAM and NVM. A second layer 1030 is a network layer. The layer 1030 may be implemented by a network protocol such as CAN, and may be based on an appropriate standard such as ISO-15765-2. The layer 1030 may be associated with dedicated resources 1035, including RAM and NVM. A third layer 1040 is a data link layer. The layer 1040 may be implemented by a data link protocol such as CAN, and may include a microprocessor CAN cell, CAN driver software, and may include bus transmission error handling. The layer 1040 may be associated with dedicated resources 1045, including RAM and NVM. A fourth layer 1050 is a physical layer. The layer 1050 includes such physical elements as bus wires, RSBus connectors, the RSBus interface circuit such as the circuit 530, and CAN transceivers such as the transceiver 520.

Figure 11:
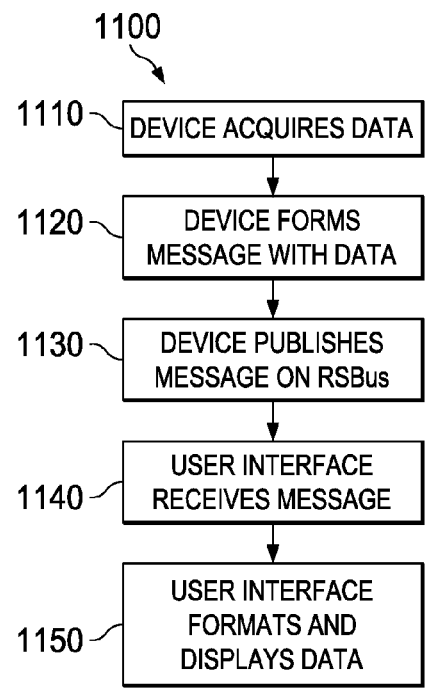
FIG. 11 is a method of conveying information related to relative humidity to a display screen.

Turning now to FIG. 11, illustrated is a method generally designated 1100 of conveying information related to relative humidity to a display screen. In some embodiments the method is used in a diagnostic mode of the system 100. A method of manufacturing the system 100 may include configuring appropriate components thereof to implement the method 1100. The method 1100 is illustrative of acquisition and display of data by the UI 240. In a step 1110, a device 410 that includes a means of capturing a parameter of interest acquires the parameter value. For example, a device 410 may include a temperature and RH sensor. The device 410 acquires the current ambient temperature and RH and in a step 1120 forms a message including the temperature and RH data. In a step 1130 the device 410 publishes the message on the RSBus 180. The publishing may be in response to a periodic update schedule, e.g., every minute. The device 410 may optionally include data indicating that the temperature or RH value is an indoor or an outdoor value. In a step 1140, the UI 240 reads the message. The UI 240 may be configured to monitor all messages from the device 410 and parse the messages to determine a course of action. In the current example, the UI 240 determines that the message includes temperature and/or humidity, and whether the data pertains to an indoor or outdoor ambient. In a step 1150, the UI 240 formats and displays the data on a display. The display may be, e.g., a component of a wall-mounted controller.

In one embodiment, the UI 240 reads four messages that are sent from the SC 230 to populate indoor/outdoor temperature and RH values on the display. Thus, the SC 230 generates one message for each indoor and outdoor temperature and RH. The SC 230 may acquire the temperature and RH data from a comfort sensor 260, e.g., interpret the data and then format the messages and then to the UI 240 over the RSBus 180.

In one embodiment, a level of abstraction is employed between a device 410 reporting a feature or parameter, e.g., temperature, and the UI 240. Thus, for example, information about features and parameters, such as feature/parameter lists, values, formats, text strings and limits may be stored within the device 410. The UI 240 need not store any of these data locally. When a device 410 is commissioned, e.g. configured at installation, the information stored thereon may be obtained by the UI 240 via a series of messages generated by the device 410.

This approach advantageously simplifies expandability, because when a device 410 is added or modified the UI 240 software need not be upgraded. Moreover, separate messages may be used to transfer a plurality of definitions and strings to the UI 240. The volume of data transferred, and the resulting time required to commission the device 410, may be reduced when the UI 240 is preloaded with certain feature and parameter definitions, such as a format or name.

Figure 12:
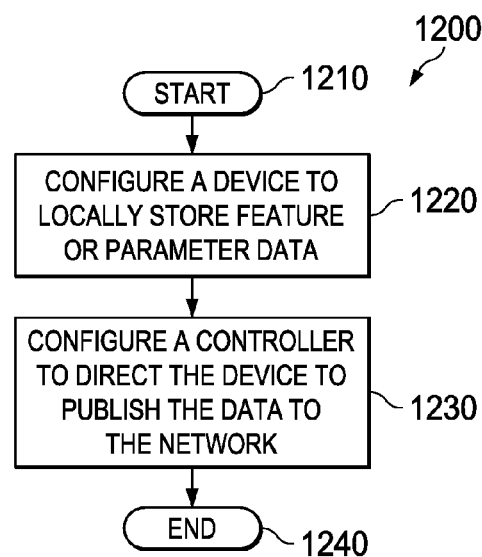
FIG. 12 is a method of updating installer parameters.

FIG. 12 illustrates a method generally designated 1200 for manufacturing an HVAC data processing a communication network. The method 1200 is described without limitation with reference to components of the network 200. The method 1200 begins with a step 1210 that may be entered from any appropriate state of the system 100. In a step 1220, the device 410 is configured to locally store feature or parameter data related to an operation thereof. In a step 1230, the SC 230 is configured to direct the device 410 to publish the data to the network 200, e.g., to other devices therein configured to listen to and read messages containing the feature or parameter data. The method 1200 ends with state 1240 from which a calling routine may resume operation.

Figure 13:
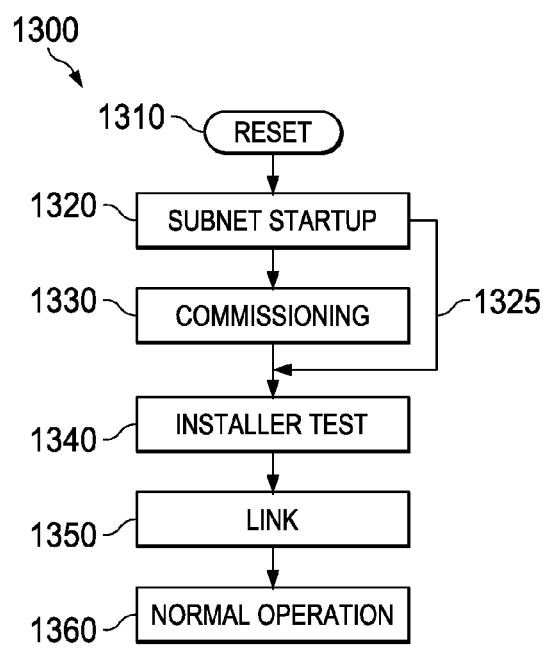
FIG. 13 illustrates an example diagram of states of the HVAC system.

Turning now to FIG. 13, illustrated is a state diagram 1300 that describes aspects of various embodiments of operation of the system 100. The state diagram 1300 may be implemented, e.g., as a state machine such as a microcontroller. The state diagram 1300 generally brings the system 100 from a reset state 1310, such as may be entered immediately upon powering up, to an operating normal operating state 1360. The state diagram 1300 advances from the reset state 1310 to a subnet startup state 1320. In the state 1320, the aSC 230a may, e.g., provide messages to devices 410 in the network 200 to synchronize the devices 410 with each other. The state diagram 1300 advances from the state 1320 to a commissioning state 1330. In the state 1330, as described further below, the aSC 230a may invoke a commissioning process to install operating parameters in the various devices 410. The state diagram 1300 advances from the state 1330 to an installer test state 1340. In the state 1340, the aSC 230a may test the functionality of the various devices 410. The state diagram 1300 advances from the state 1340 to a link state 1350. In the state 1350, the subnet controllers of a plurality of subnets may link the subnets for proper operation. The state diagram 1300 advances from the state 1350 to a normal operation state 1360. In the state 1360, the device 410 operates normally to, e.g., actively control the temperature of the premises in which the system 100 is installed. It is expected that the system 100 will operate in the state 1360 for the vast majority of its operating life.

The commissioning process differs from subnet startup 1320 in that the former requires that the network configuration steps, e.g., the subnet startup state 1320, have been completed before commissioning can start. In some circumstances, beyond the scope of this discussion, the state 1320 may advance directly to the installer test state 1340 as indicated by a transition 1325. The commissioning process may be, e.g., a number of states of a state machine or microprocessor configured to execute various commands. Included in the state machine states may be two states referred to for convenience as a Parameter_Scan state and a Parameter_Update state.

In the Parameter_Scan state, the active subnet controller, e.g., the aSC 230a, may direct all devices 410 via bus messages to publish current values of some or all of their locally stored parameters. The publishing may include an indication of whether the queried device 410 is enabled or disabled. The queries may be generated sequentially, once per queried parameter, and may result in a separate response from the queried device 410 to each query. The SC 230 may then relay the responses to the UI 240 or UI/G 250, as applicable. The UI 240 or UI/G 250 may then update its memory to reflect the status of the latest parameter values.

The system 100 may configure the devices 410 in a configuration mode, which may be one or more subroutines that operate as a result of power-up, e.g. In the configuration mode, the UI 240 or UI/G 250 may interpret the data acquired from the devices 410 in the Parameter_Scan state to determine if there is any ambiguity or conflict among the data, such as regarding the parameter data format, definition or name. The UI 240 or the UI/G 250 may be configured to query the device 410 that is the source of the ambiguity or conflict for further information on each parameter. When any ambiguities or conflicts are resolved, the UI/G 250 may advance to the Parameter_Update state.

In the Parameter_Update state, the SC 230 (aSC) the installer (a service technician, e.g.) may interact with each device of the system 100 via the UI 240 and update installer parameters thereon. (The following description also pertains to embodiments in which the installer communicates with the system 100 via the UI/G 250.) Installer parameters may include, e.g., various adjustable values that determine aspects of performance of the system 100 that may be modified by the installer.

In some cases, one parameter on a first device 410 may depend on the state of another parameter on the first device 410, or on a parameter on a different second device 410. A parameter X that resides in a first device 410, "device A," is a dependent parameter of a second device 410, "device B," if device B requires the current value of parameter X for proper operation. Such a dependent parameter is referred to as a cross-dependent parameter. For example, a heat pump may have a parameter that indicates a cooling or heating capacity. An air handler may be configured to provide air flow in proportion to the heating or cooling capacity of the heat pump. In this case, the capacity parameter is a cross-dependent parameter of the air handler.

In some embodiments, during the commissioning state 1330, each device 410 publishes its parameter values one by one over the data bus 180. Other devices update themselves with any needed dependent parameter values by listening to the messages on the data bus 180 while a scanning step, described further below, is in progress. The aSC 230a may then request confirmation from each device 410 that each needed dependent parameter values has been obtained by that device 410.

In some cases, however, a dependent parameter value on device B may become invalid if an installer changes that value manually on device A during the commissioning process. In some embodiments, the UI 240 advantageously interrogates each device 410 for a list of dependent parameters upon which that device relies for proper operation. If the installer modifies any of these dependent parameters, e.g., a parameter on device A that is a dependent parameter of device B, the UI 240 provides the updated parameter to the affected device, e.g., device B, as soon as the original device, e.g., device A, confirms that new value is accepted.

A device 410 may have a parameter that depends on the value of another parameter on the device 410. For example, a furnace with an integrated blower may scale the blower output to the furnace capacity. The blower may be associated with a parameter A10 that is proportional to a parameter A1 associated with the furnace capacity. The parameter A10 is an "internally dependent" parameter. In some cases, another device 410, e.g. UI 240, may have a need for the value of an internally dependent parameter of another device 410, e.g., the IFC 220. For example, the UI 240 may display the value of the internally dependent parameter to the installer upon request.

During the commissioning state 1330, a scanning step may be performed in which each device 410 publishes its parameter values over the data bus 180. Other devices 410 are configured to listen for parameters that are relevant to their operation. The listening devices update themselves with any needed parameter values when they recognize a relevant parameter message as being relevant. The aSC 230a then instructs, via an appropriately configured message, each device 410 to publish the identity of any needed dependent parameters missed during the scanning step. The aSC 230a may then direct the appropriate device holding the needed parameter to publish that parameter.

Some device parameters may need to be configured differently depending on the presence or state of other components in the system 100. For example, as described earlier, an air handler 110 blower capacity may be set differently for heat pumps that have different heating and cooling capacities.

The device 410 may address this issue by looking at the published features and parameters from all other relevant devices 410 on the subnet. Continuing the example of the blower, the air handler 110 blower can determine the type of outdoor unit it is matched with from the commissioning process. The air handler 110 may then self-configure to the extent of adjusting its parameters according to the data known to it. The air handler 110 may then send the parameters resulting from the self-configuration to the SC 230, the UI 240 and the UI/G 250 so these devices have a correct record of the air handler 110 parameters.

Figure 14:
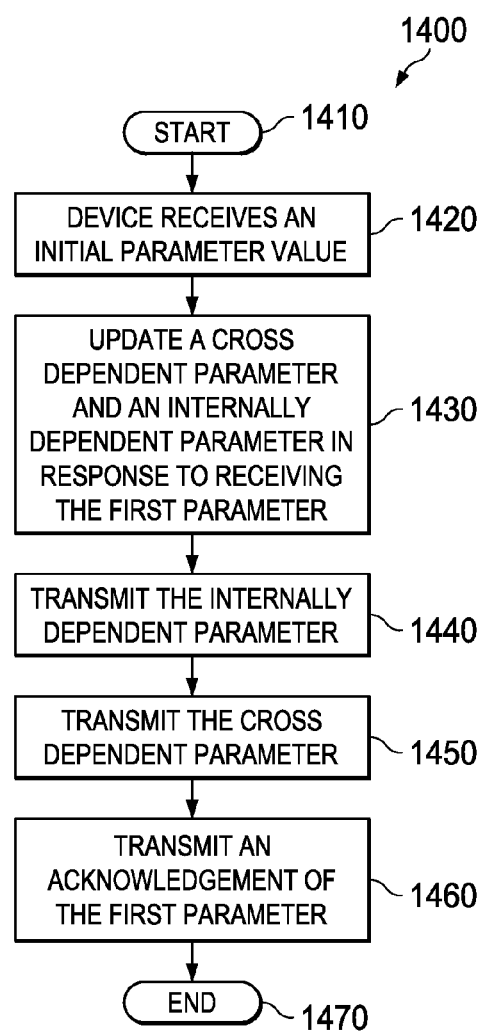
FIG. 14 is a method of automatically updating a device parameter.

FIG. 14 illustrates a method of the disclosure generally designated 1400 of automatically updating a device parameter. The method 1400 begins with a step 1410, which may be entered, e.g., during a configuration state of the system 100. In a step 1420, the UI 240 sends a new value of a parameter B1 to the IFC 220. The IFC 220 has a cross-dependent parameter A1 that depends on the value of B1. The IFC 220 also has an internally dependent parameter A10 that depends on the value of A1. In a step 1430 the IFC 220 sets the value of A1 as appropriate to the value of B1, and the value of A10 as appropriate to the value of A1. In a step 1440, the IFC 220 sends the updated value of A10 first to the UI 240. In a step 1450, the IFC 220 sends the updated value of A1 to the UI 240. Then, in a step 1460, acknowledges the receipt of the parameter B1 by, e.g., sending a message to the UI 240 including the value of B1. The method 1400 ends with a step 1470 from which operation of a calling routine may resume.

The method 1400 advantageously communicates the dependency of A10 on A1 to the UI 240. In various embodiments, the UI 240 would otherwise have no knowledge of the existence of A10 since it is an internally dependent parameter. The UI 240 may have knowledge of the dependence of A1 on B2 after completion of the scanning step. Thus, the UI 240 may expect to receive the value of A1 prior to the acknowledgement of B1. In the present embodiment, the UI 240 is configured to recognize the receipt of A10 prior to A1 as indicating the dependence of A10 on A1. The UI 240 may then properly handle the parameter A10, including, e.g., displaying the value thereof.

In some cases, parameters of the device 410 may be cross-dependent across multiple devices. For example, parameter AP1 from device A is dependent on parameter BP2 in device B, but BP2 may in turn be dependent on the value of a parameter CP3 from device C. If CP3 is changed, AP1 and BP2 may both be affected. In some preferred embodiments both AP1 and BP2 are checked and corrected if necessary. Parameters that change based on the change of an intervening dependent parameter are referred to as secondary parameters. In many cases it may be desirable to inform the user or installer of the existence of secondary parameters to ensure that such parameters are properly configured.

FIG. 15 illustrates a method generally designated 1500 of displaying parameter dependencies to the user on the UI 240 that advantageously informs the user or installer of changes to secondary parameters. In a step 1510 the UI 240 changes a parameter value on a device 410, e.g., A. In a step 1520, the device 410 that owns A, and/or other devices 410, sends the updated values of secondary parameters to the UI 240. In a step 1530, the UI 240 displays the secondary parameter and highlights parameter values associated therewith. In a step 1540, the UI 240 forces the user to acknowledge the secondary parameter values. The forcing may take the form, e.g., of requiring the user to confirm the value before the UI 240 exits the menu item in which the parameter values are being displayed. In some embodiments, the UI forces the user to confirm the value of each secondary parameter.

Conventional HVAC systems require a manual assignment of interface IDs of a temperature sensor and a user interface via a user-selectable hardware device, such as a dip switch, jumper wire, or the like. Thus, conventional procedure is generally undesirable in the context of embodiments of the disclosure, wherein simplicity of configuration and self-configuration are broad objectives.

Accordingly, a method of the disclosure provides a means for automatically selecting and assigning comfort sensor and UI IDs. Broadly, the method employs a physical address of a device 410 (e.g. a comfort sensor 260 or a user interface 240)

as well as a bus address thereof to assign an ID to the device 410. An equipment ID is generated therefrom and embedded in an equipment type number.

In one embodiment, a comfort sensor 260 and a UI 240 are physically located in a same physical package, e.g. a wall-mountable enclosure. Devices located in a same physical package share a same physical address referred to herein as a device designator (DD). Thus, the CD and the UI share a same physical address. However, two such devices may have a different logical address.

FIG. 16 illustrates a method of the disclosure generally designated 1600 of manufacturing an HVAC system, e.g. the system 100. In a step 1610, the system 100 assigns to each UI 240 during a system initialization process a unique address, referred to herein as a UIID. In a step 1620 this unique address is embedded in an equipment type number and then assigned to the UI 240. The UI with the largest DD is assigned the highest (or lowest) available ID, which is dependent on the total number of devices discovered in the system. Another UI, if present, is assigned the next highest (or lower) available ID. The assignment process is repeated until all UI devices are assigned a UIID. The UI equipment type number is computed as a sum of the UIID and a first hexadecimal offset value selected for use with user interfaces. In a nonlimiting example for discussion purposes, the first hexadecimal value is $Offset1, and the UI equipment type number is determined as:

UI Equipment Type Number=*UIID*+$Offset1.

In a step 1630, the system 100 assigns each comfort sensor 260 a unique comfort sensor ID, CSID, that is embedded in the equipment type number of the CS. For a CS embedded in a control unit, the system 100 sets the CSID equal to the UIID of the associated control unit. The comfort sensor 260 may be reported to the installer/user with the CSID.

The equipment type number of the CS is then determined as a sum of the CSID and a second hexadecimal value selected for use with comfort sensors 260. In a nonlimiting example for discussion purposes, the second hexadecimal value is $Offset2, and the CS equipment type number is determined as:

CS Equipment Type Number=*CSID*+$Offset2.

In a step 1640, the CS equipment type number is assigned to the CS.

The values of $Offset1 and $Offset2 may be determined by system design considerations.

When the UI and the CS are not physically located in the same enclosure, the system 100 may assign during subnet startup a unique address and ID to each UI and CS. The address may then be embedded in the equipment type. For each UI and CS a device ID may be determined by an arbitration scheme as described previously. The device equipment number, e.g. the CSID or the UIID, is then determined as the device ID determined via the arbitration scheme plus a base equipment type number.

Those skilled in the art to which this application relates will appreciate that other and further additions, deletions, substitutions and modifications may be made to the described embodiments.

What is claimed is:

1. An HVAC data processing and communication network, comprising:
    a system device coupled to a data bus by a first physical layer interface and including:
        an HVAC component configured to provide an HVAC service; and
        a local controller configured to locally store feature or parameter data related to an operation of said system device; and
    a subnet controller coupled to said data bus by a second physical layer interface and configured to publish a first message via said data bus directing said system device to publish to said data bus a second message including said feature or parameter data.

2. The network as recited in claim 1, further comprising a user interface including preloaded feature or parameter data associated with said system device.

3. The network as recited in claim 2, wherein said subnet controller is configured to direct said system device to publish only said feature or parameter data that is not included in said preloaded data.

4. The network as recited in claim 1, wherein said system device is configured to publish said feature or parameter data during a commissioning process.

5. The network as recited in claim 1, wherein said system device replaces another system device in said network.

6. The network as recited in claim 1, wherein said feature or parameter data include parameter values, definitions and strings.

7. The network as recited in claim 6, wherein said subnet controller is configured to publish separate messages to retrieve said values, definitions and strings.

8. A method of manufacturing an HVAC data processing and communication network, comprising:
    configuring a system device coupled to a data bus to provide an HVAC service from an HVAC component, and to locally store feature or parameter data related to an operation of said system device; and
    configuring a subnet controller to publish a first message via said data bus directing said system device to publish to said data bus a second message including said feature or parameter data.

9. The method as recited in claim 8, further comprising coupling to said data bus a user interface including preloaded feature or parameter data associated with said system device.

10. The method as recited in claim 9, further comprising configuring said subnet controller configured to direct said system device to publish only said feature or parameter data that is not included in said preloaded data.

11. The method as recited in claim 8, further comprising configuring said system device to publish said feature or parameter data during a commissioning process.

12. The method as recited in claim 8, wherein said system device is configured to replace another system device in said network.

13. The method as recited in claim 8, wherein said feature or parameter data include parameter values, definitions and strings.

14. The method as recited in claim 8, wherein said second message includes only one of said feature or parameter data.

15. A system for storing information about attached devices in an HVAC data processing and communication network, the system comprising:
    at least one system device coupled to a data bus by a first physical layer interface and including an HVAC component configured to provide an HVAC service; and
    a user interface having a second physical layer interface, said user interface being coupled to said at least one device via said data bus,
    wherein said at least one system device is configured to store feature or parameter data and to publish to said data bus said feature or parameter data upon command by said user interface.

16. The system of claim 15, wherein said at least one system device further includes information about system device features that can be collected at said user interface.

17. The system of claim 15, wherein said information about system device parameters includes actual list information.

18. The system of claim 15, wherein said information about device parameters includes value information.

19. The system of claim 15, wherein said information about device parameters includes format information.

20. The system of claim 15, wherein said user interface includes a querying subsystem for querying said devices to which it is coupled for information about device parameters, and a storage subsystem for storing said information it receives in response to its queries to devices to which it is coupled for information about devices parameters.

* * * * *